United States Patent [19]

Aghevli et al.

[11] Patent Number: 5,076,793
[45] Date of Patent: Dec. 31, 1991

[54] FRACTAL MATHEMATICS KIT

[76] Inventors: Behrouz B. Aghevli; Shahine B. Aghevli, both of 2300 Pimmit Dr., No. 1015, Falls Church, Va. 22043

[21] Appl. No.: 418,153

[22] Filed: Oct. 6, 1989

[51] Int. Cl.$^5$ ................................................ G09B 1/00
[52] U.S. Cl. .................................... 434/196; 434/195; 434/211; 273/157 R; 273/DIG. 30
[58] Field of Search ............... 434/191, 195, 196, 200, 434/211, 189; 273/153 R, 153 P, 156, 157 R, DIG. 30; 40/586; D19/52.54; 428/100, 900, 913.3, 542.2

[56] References Cited

U.S. PATENT DOCUMENTS

| | | |
|---|---|---|
| 234,247 | 11/1880 | Classen . |
| 384,195 | 6/1888 | Duryea .......................... 273/261 X |
| 846,485 | 3/1907 | Lfitch . |
| 895,114 | 8/1908 | Scrutchin ........................ 273/157 R |
| 1,573,358 | 2/1926 | Ross .................................... 434/407 |
| 2,663,096 | 12/1953 | McCurdy ................................ 35/70 |
| 3,002,295 | 10/1961 | Armstrong .............................. 35/31 |
| 3,125,814 | 3/1964 | Walcuk .................................... 35/32 |
| 3,452,454 | 7/1969 | Easton et al. ........................ 434/189 |
| 3,608,906 | 9/1971 | Odler .......................... 273/28.2 A X |
| 4,177,581 | 12/1979 | Walker ................................. 434/200 |
| 4,382,794 | 5/1983 | Preus ................................... 434/193 |
| 4,504,234 | 3/1985 | Jarvis .................................. 434/188 |
| 4,515,370 | 5/1985 | Garcia ................................. 273/258 |
| 4,548,585 | 10/1985 | Kelly .................................. 434/195 |
| 4,585,419 | 4/1986 | Rinaldelli ............................ 434/189 |
| 4,699,385 | 10/1987 | Bifulco ........................ 273/282 A X |
| 4,902,021 | 2/1990 | Burroughs .......................... 273/260 |
| 4,913,436 | 4/1990 | Li .................................... 273/157 R |

FOREIGN PATENT DOCUMENTS 2133297 7/1984 United Kingdom ................ 273/156

Primary Examiner—Richard J. Apley
Assistant Examiner—J. Doyle
Attorney, Agent, or Firm—Lane, Aitken & McCann

[57] ABSTRACT

A fractal mathematics learning kit includes a plurality of boards each in the shape of an equilateral triangle having defined thereon a pattern of ten smaller equilateral triangles, and a plurality of manipulative elements made of one or more connected equilateral triangles which are attached to the equilateral triangles defined on the boards. A set of tokens thick enough to stand on an edge and comprising combinations of equilateral triangles to represent numbers is also included. Also included in the kit is a mat defining rows and columns of fractal representations of numbers by which various mathematical operations can be understood. A set of nesting pyramids of graduated sizes representing numbers of magnitudes generally corresponding to the sizes is also provided, as are pyramids of different sizes which can be stacked through the use of trays and transparent covers. The kit includes a work book and a user's manual.

36 Claims, 36 Drawing Sheets

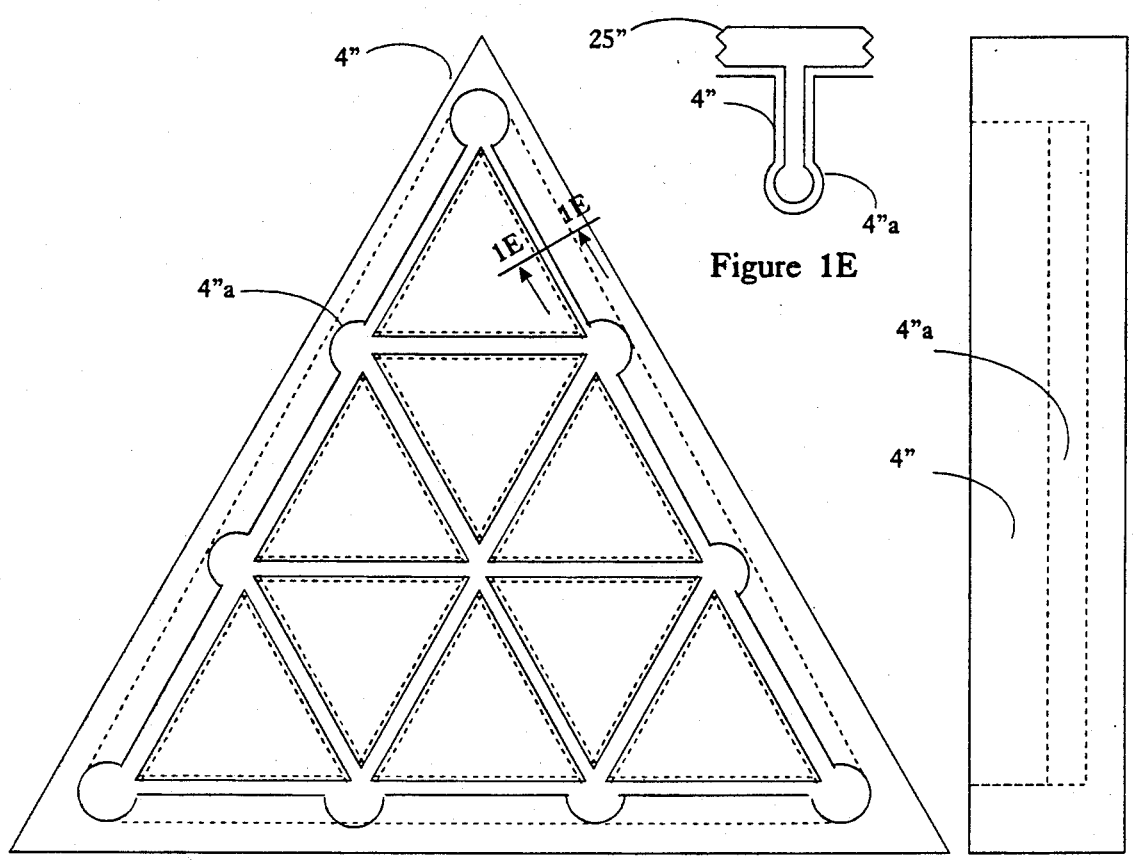
Figure 1D    Figure 1E    Figure 1F
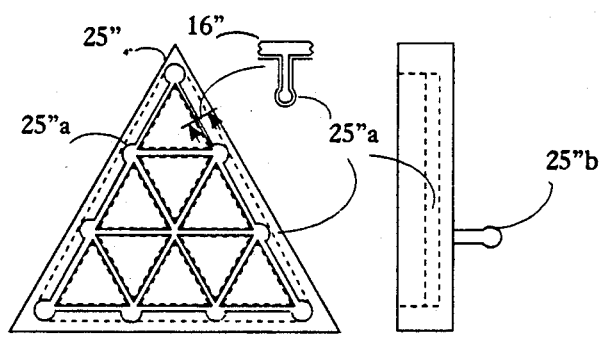
Figure 1G    Figure 1H
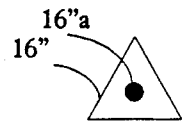 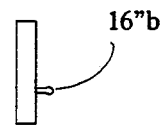
Figure 1I    Figure 1J

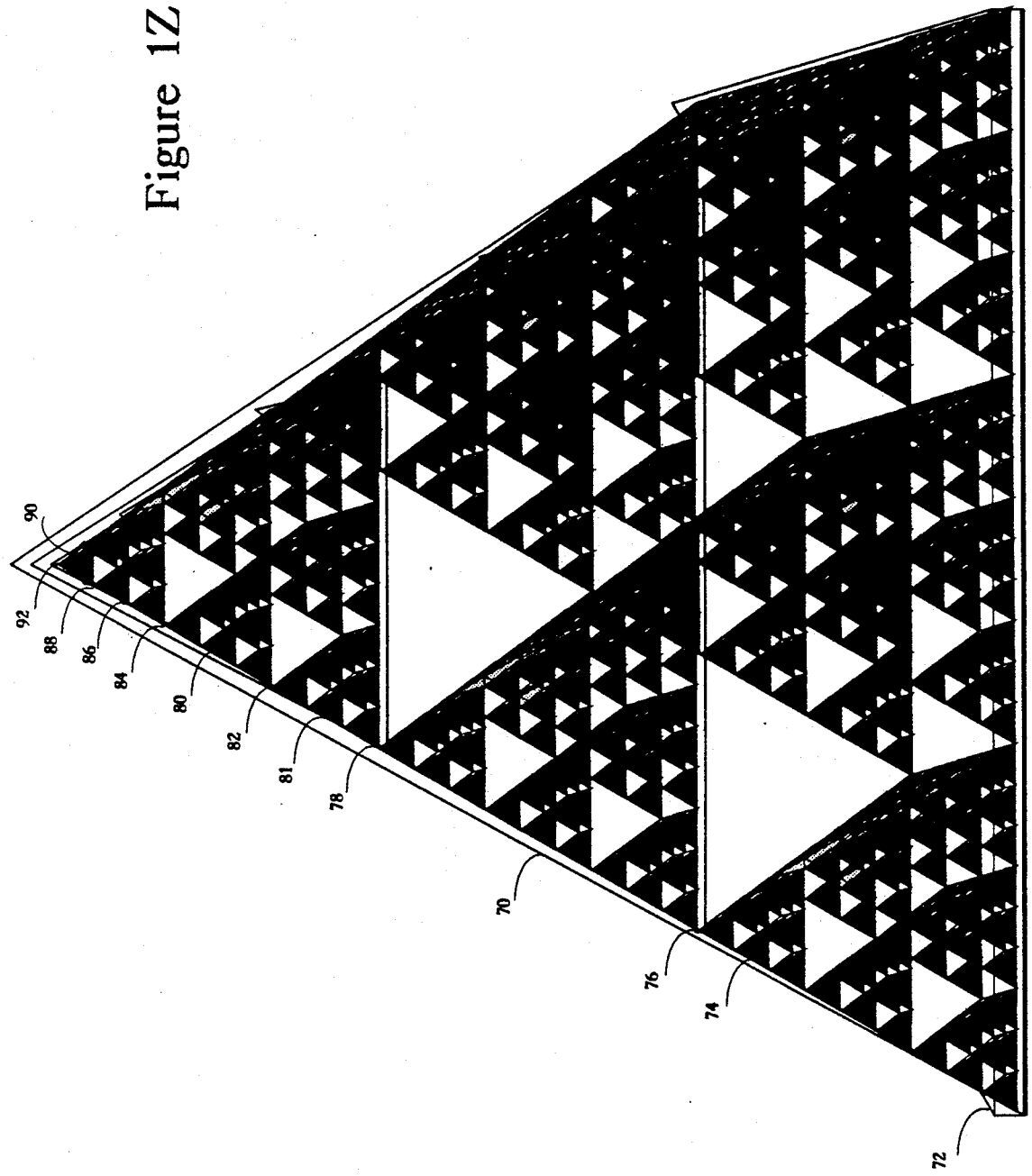

FRACTAL MATHEMATICS KIT

A fractal mathematics kit comprises a plurality of educational aids for learning basic mathematical concepts. It comprises: i) a storage box; ii) work book; iii) user's manual; iv) manipulative attachable or stackable components of many sizes assembled from basic units made of thin or thick solitary unilateral triangles or pyramids in different colors and with different surface textures, or displaying numerals and mathematical symbols, and triangular or pyramidal representations of one-digit prime numbers formed for each number by assembling as many basic units of a particular color and surface texture into a special symmetric configuration. Each composite one-digit number is represented by a special assembly of multiple copies of any one of its prime factors, each two-digit number ending in a zero in any base from one to ten is formed as a larger replica of the shape of its non-zero digit but built from super units instead of basic units, where a super unit in any base corresponds to the one-digit representation of the base number. In particular, ten basic units arranged into a larger equilateral triangle or pyramid represent ten in base ten, exploiting the self similarity of one- and two-digit numbers. The three digit numbers are formed using super-super units. This representation can easily be generalized to all multiple-digit numbers in any base from one to ten, and is called the fractal representation for numbers. The fractal mathematics kit further comprises v) a multi-purpose multiplication table on a very large mat displaying special fractal representations of multiples of the numbers one to ten formed using the manipulative components.

FIELD OF THE INVENTION

This invention relates to the field of educational aids, kits, toys and games for developing basic mathematical skills, in particular for counting and arithmetic.

BACKGROUND OF THE INVENTION

The traditional method of teaching children how to count and do arithmetic is inadequate for three essential reasons: 1) the child needs to memorize numerous names for numbers bigger than nine and the nomenclature used for naming these numbers partially hides the similarity of the numbers, e.g., one, ten, hundred, thousand, etc., which are the units of counting in base ten; 2) no useful manipulative objects or concepts are used to teach arithmetic, e.g. the multiplication table is still memorized using brut force or flash cards at best; and 3) no sense of the order of magnitude for large or small number is given to the child.

The following U.S. patents disclose kits, tools or apparatus which try to alleviate one or more of the three above mentioned inadequacies, but none of them deals with all three inadequacies in a satisfactory manner. In particular, items 1) and 3) above are not practically dealt with at all, and the manipulative objects proposed for item 2) deal either only with one digit addition and subtraction or, when dealing with multiple-digit arithmetic, are too difficult and complex to be of general use.

U.S. Pat. No. 4,504,234 to Jarvis discloses a device useful for teaching the concept of squares, cubes, and roots. Smaller square or rectangular pieces are detachably secured to the array 13 by a hook and loop fastener.

U.S. Pat. No. 4,548,585 to Kelly discloses ten shapes, each distinctive of an integer from one to ten and each being distinctively colored. The shapes of at least some of the integers can be placed together in a composite shape which is the same as the shape of the larger integer to which the smaller integers add up.

U.S. Pat. No. 4,585,419 to Rinaldelli discloses an aid for teaching number systems of any base. For the base 10, unit cubes are used to fill up a first box, and ten such filled boxes are used to make up a larger box, and so on. The same can be done with number systems based on other numbers, but different size boxes must be used. For example, for counting in the base 2, the smallest box contains two unit cubes, the next larger box contains two of the smaller boxes, and so on.

U.S. Pat. No. 234,247 to Classen discloses an apparatus for teaching arithmetic having blocks D, E and F of three orders of magnitude (in the base 10). These blocks are used with one another to represent figures as shown in FIG. 1 where the numbers 146 and 67 are added. Blocks representing each of the numbers are positioned directly above or below the associated number in spaces provided in the apparatus. The blocks in the spaces below the second number are then placed in the spaces above the first number to illustrate the addition of the units.

U.S. Pat. No. 846,485 to Leitch discloses the use of different colors in teaching arithmetic and numerical values.

U.S. Pat. No. 2,663,096 to McCurdy discloses an educational toy including blocks made in various lengths from a size one unit long to a size ten units long. An error control blueprint is a sheet marked with squares or rectangles which correspond exactly in size with the unit sizes of the blocks, thereby indicating the correct pattern for stacking the blocks from the ten-unit length up to the one-unit length.

U.S. Pat. No. 3,002,295 to Armstrong discloses a device for teaching number concepts which includes an arithmetic answerboard which is lineated into a plurality of square spaces which define a plurality of vertically extending rows. A series of blocks or movable members can be positioned on the board, the blocks being of various lengths, from one to ten units, corresponding in size to the spaces on the board. The spaces on the board are numbered from bottom to top such that the number in each space represents the number of spaces below that space and, therefore, the number of block units which would cover the spaces below that space. For example, in row 20A, the space having the numeral 1 is exposed indicating that one unit block is positioned on the board below that space. The elements in each row 20 of spaces on the board are of different colors from the first to the tenth row, and the color cycle can repeat itself from the eleventh to the twentieth row. Furthermore, only one space in the first row is colored, two elements in the next row are colored, and so on progressively across the board. The blocks, which are divided into spaces equal to the spaces on the board, can be colored to correspond with a particular row on the board. Furthermore, various blocks can be placed in one row and the total number of units in the blocks will be reflected in the empty space above the top block in the row. Subtraction, multiplication and division can also be taught using the device.

U.S. Pat. No. 3,125,814 to Walcuk discloses a counting device including unit elements, tens elements, and hundreds elements, wherein the hundreds elements are stackable to represent one thousand in three dimensions.

U.S. Pat. No. 4,382,794 to Preus discloses an instructional aid consisting of a plurality of objects each corresponding to an integer between one and ten and having a thickness representing the number to which it corresponds. In addition to integers, a plurality of objects of different shapes are provided, a characteristic of the shape of each object corresponding to an integer between one and ten. The objects have distinctive colors, including combinations of colors representing the factors of the integer, where the integer is not a prime number. Moreover, the English name of the integer or the integer with which a shape is associated is provided on the integer or shape.

SUMMARY OF THE INVENTION

The purpose of this invention is to furnish a kit containing a plurality of related self-instruction material with which a complete basic mathematical program can be learned.

Another purpose of this invention is to provide several visual instruction aids which are fascinating and can easily be mastered by children with minimum coaching or instruction.

Another purpose of this invention is to provide new and simple semantics based on the shape of objects to facilitate the comprehension of basic mathematical concepts.

Another purpose of this invention is to provide a universal learning tool that can be used by all the children in the world.

Another purpose of this invention is to provide a plurality of manipulative objects representing single-digit and multiple-digit numbers that can be used for comprehending and mastering of basic mathematical concepts such as: recognition and counting of numbers in base ten as well as other bases; the four basic arithmetic operations of addition, subtraction, multiplication, and division; fractions, decimals, powers, and roots; orders of magnitude, limits tending to infinity or zero; and fractal structures.

Another purpose of this invention is to provide a tool for learning basic mathematical concepts and structures with easy self learning games.

Another purpose of this invention is to provide a method of learning basic mathematics which is fascinating to children and adults alike.

Another purpose of this invention is to provide a tangible and manipulative kit which can be used by blind, deaf and mentally handicapped children.

Other purposes of this invention will become clear from the accompanying specification and drawings.

The above noted purposes and other purposes of this invention are accomplished by a mathematics kit comprising: i) a storage box; ii) work book; iii) user's manual; iv) manipulative attachable or stackable components of many sizes assembled from basic units made of thin or thick solitary unilateral triangles or pyramids in different colors and with different surface textures, or displaying numerals and mathematical symbols, and triangular or pyramidal representations of one-digit prime numbers formed for each number by assembling as many basic units of a particular color and surface texture into a special symmetric configuration. Each composite one-digit number is represented by a special assembly of multiple copies of any one of its prime factors, each two-digit number ending in a zero in any base from one to ten is formed as a larger replica of the shape of its non-zero digit but built from super units instead of basic units, where a super unit in any base corresponds to the one-digit representation of the base number. In particular, ten basic units arranged into a larger equilateral triangle or pyramid represent ten in base ten, exploiting the self similarity of one- and two-digit numbers. The three digit numbers are formed using super-super units. This representation can easily be generalized to all multiple-digit numbers in any base from one to ten, and is called the fractal representation for numbers. The fractal mathematics kit further comprises v) a multi-purpose multiplication table on a very large mat displaying special fractal representations of multiples of the numbers one to ten formed using the manipulative components.

BRIEF DESCRIPTION OF THE DRAWINGS

The above and other objects, features and advantages of this invention will be better appreciated by the following detailed method of use and the drawings briefly described below.

DETAILED DESCRIPTION OF THE PREFERRED EMBODIMENT

Figure 1A:
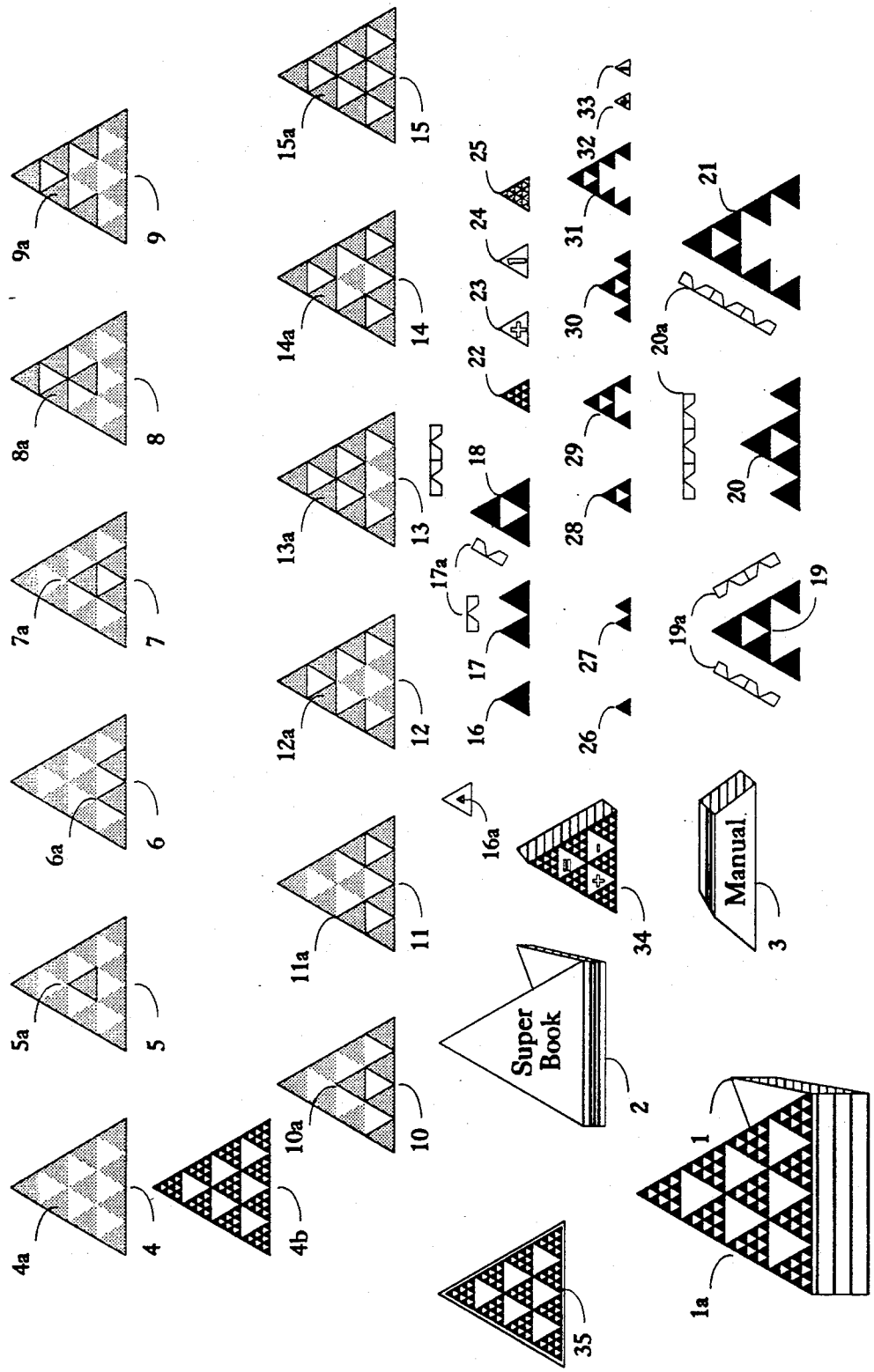
FIG. 1A–1V and 1X–1Z give detailed isometric views of the elements of the kit of material associated with this invention.
Figure 1B:
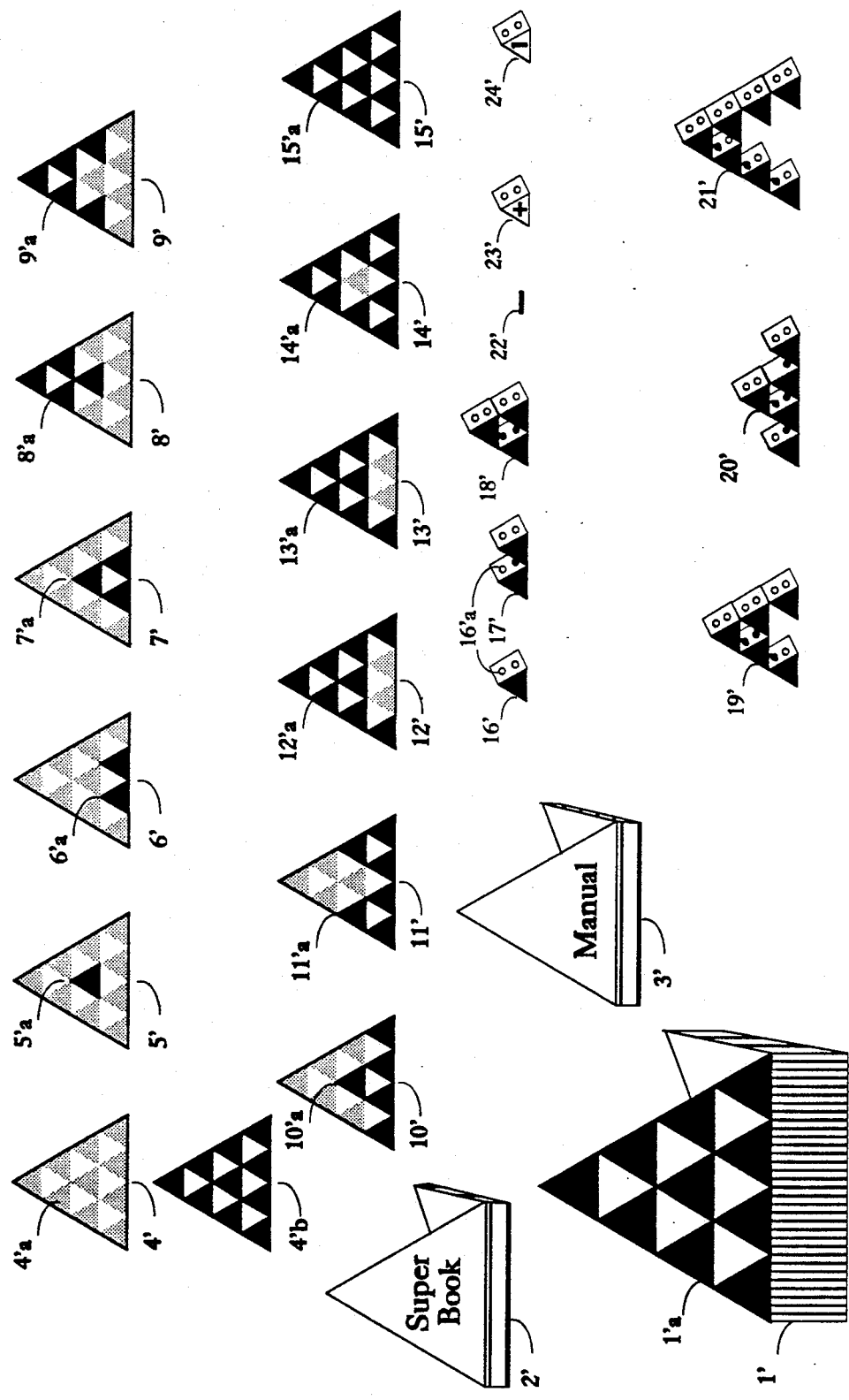
Figure 1C:
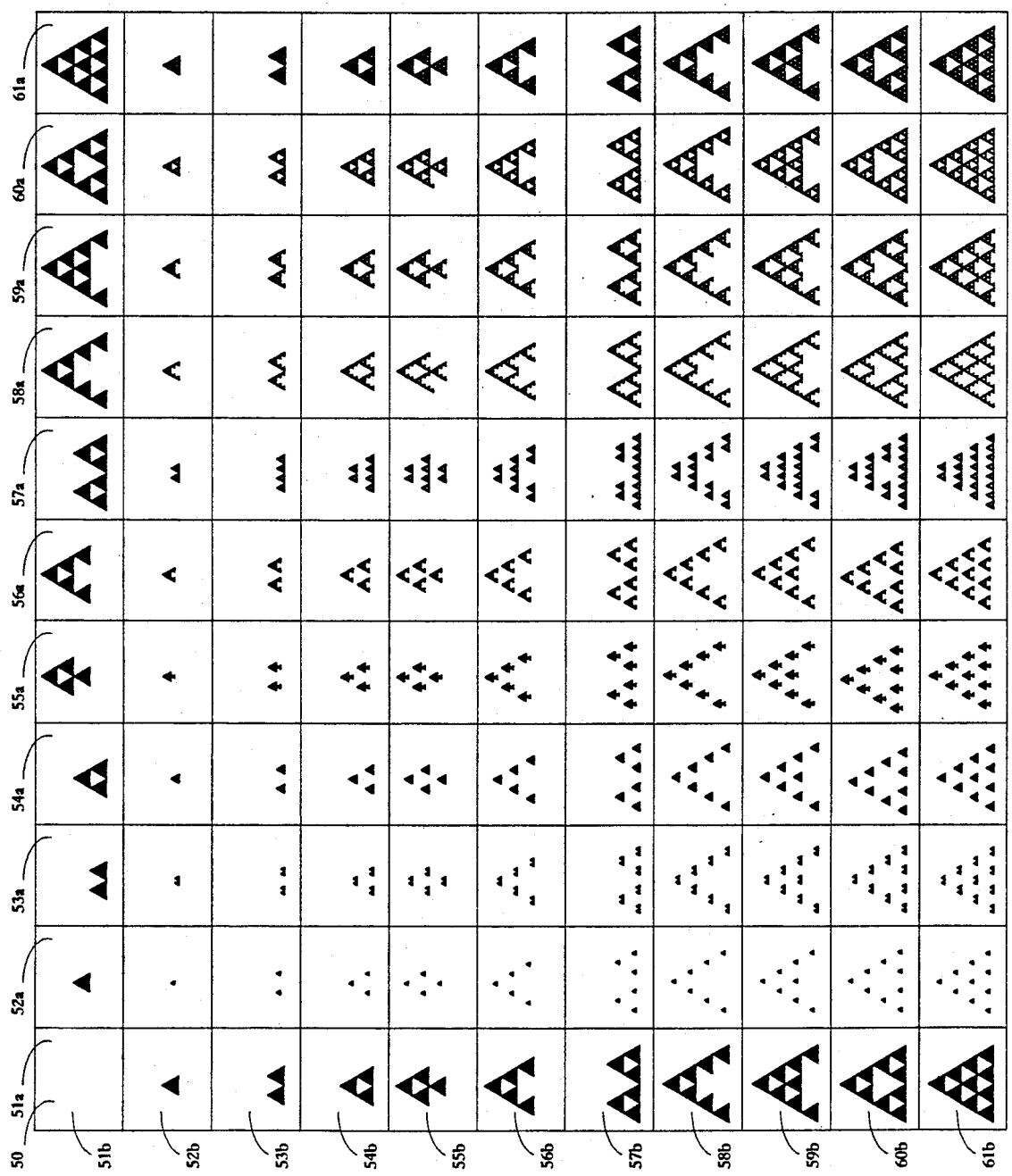
Figure 1K:
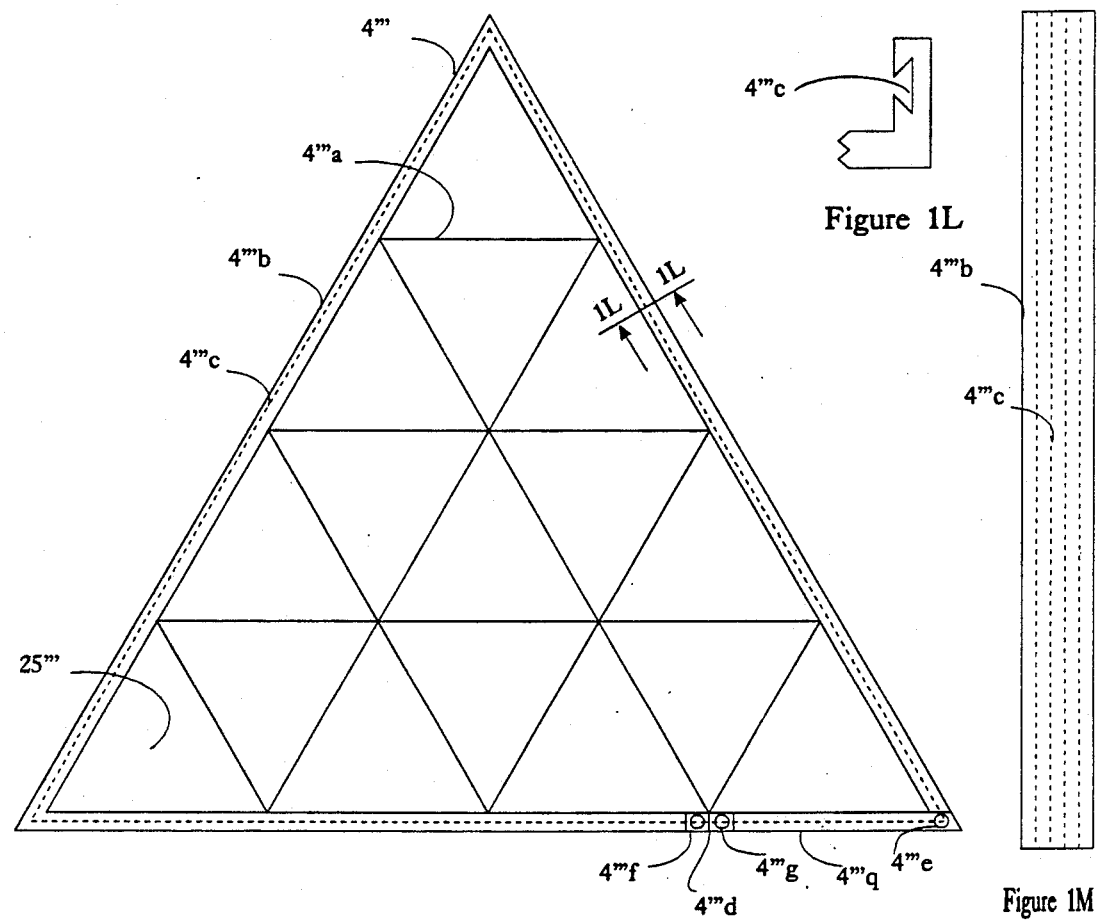
Figures 1N, 1O, 1Q, 1R:
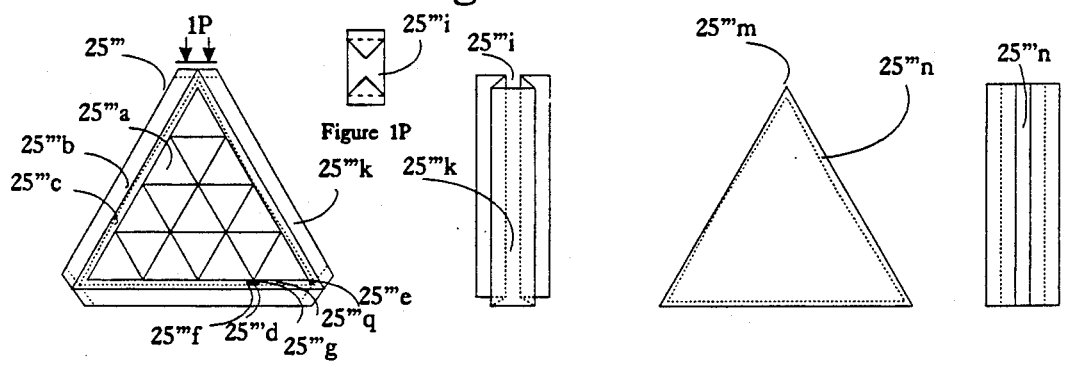
Figures 1S, 1T, 1U, 1V:
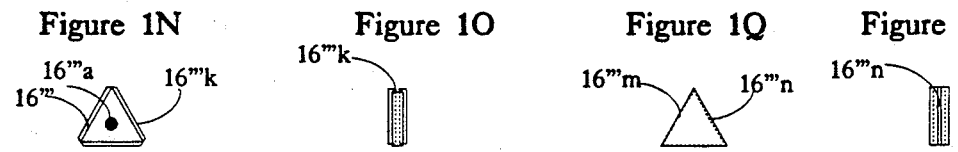
Figure 1X:
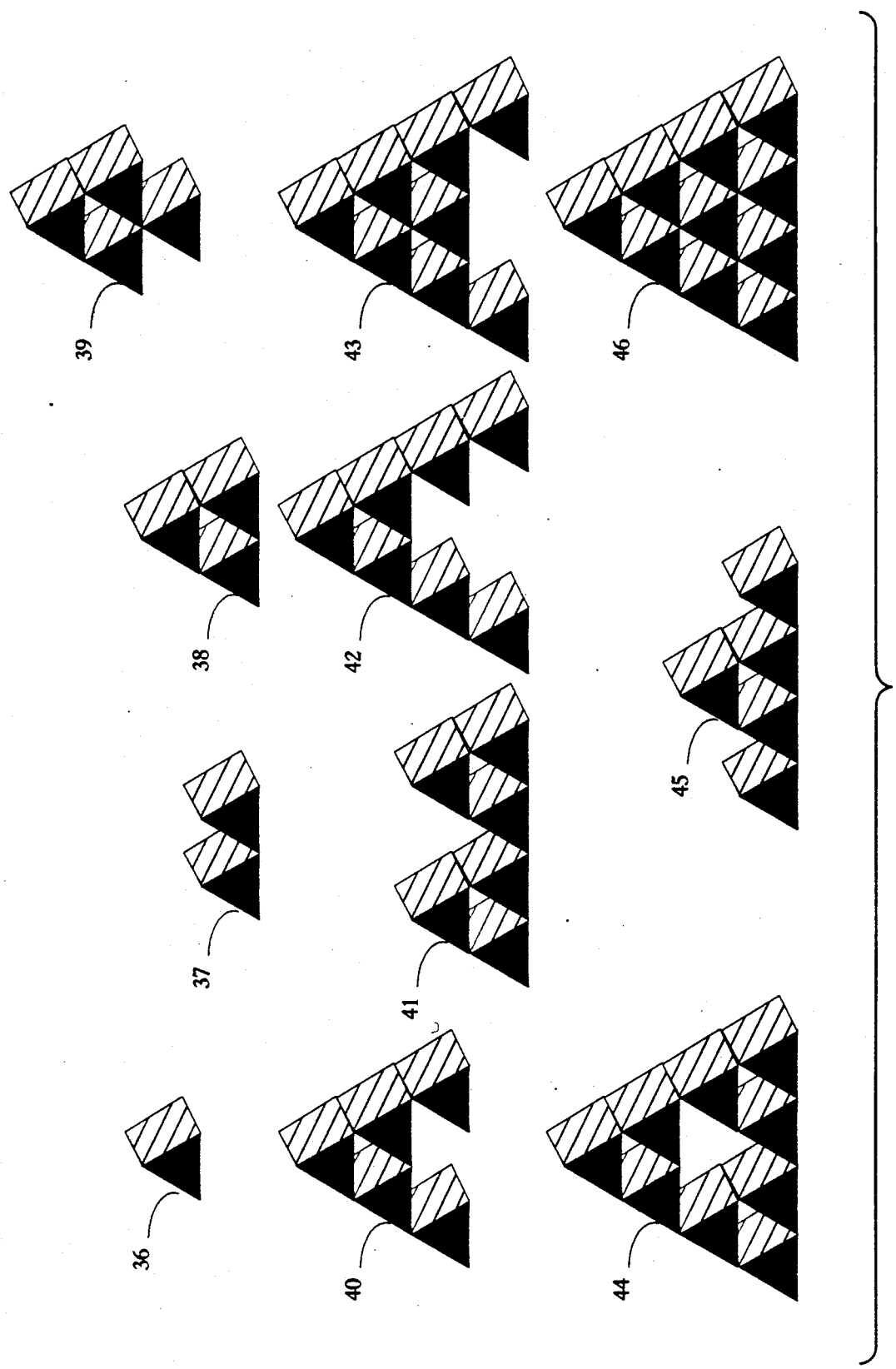
Figure 1Y:
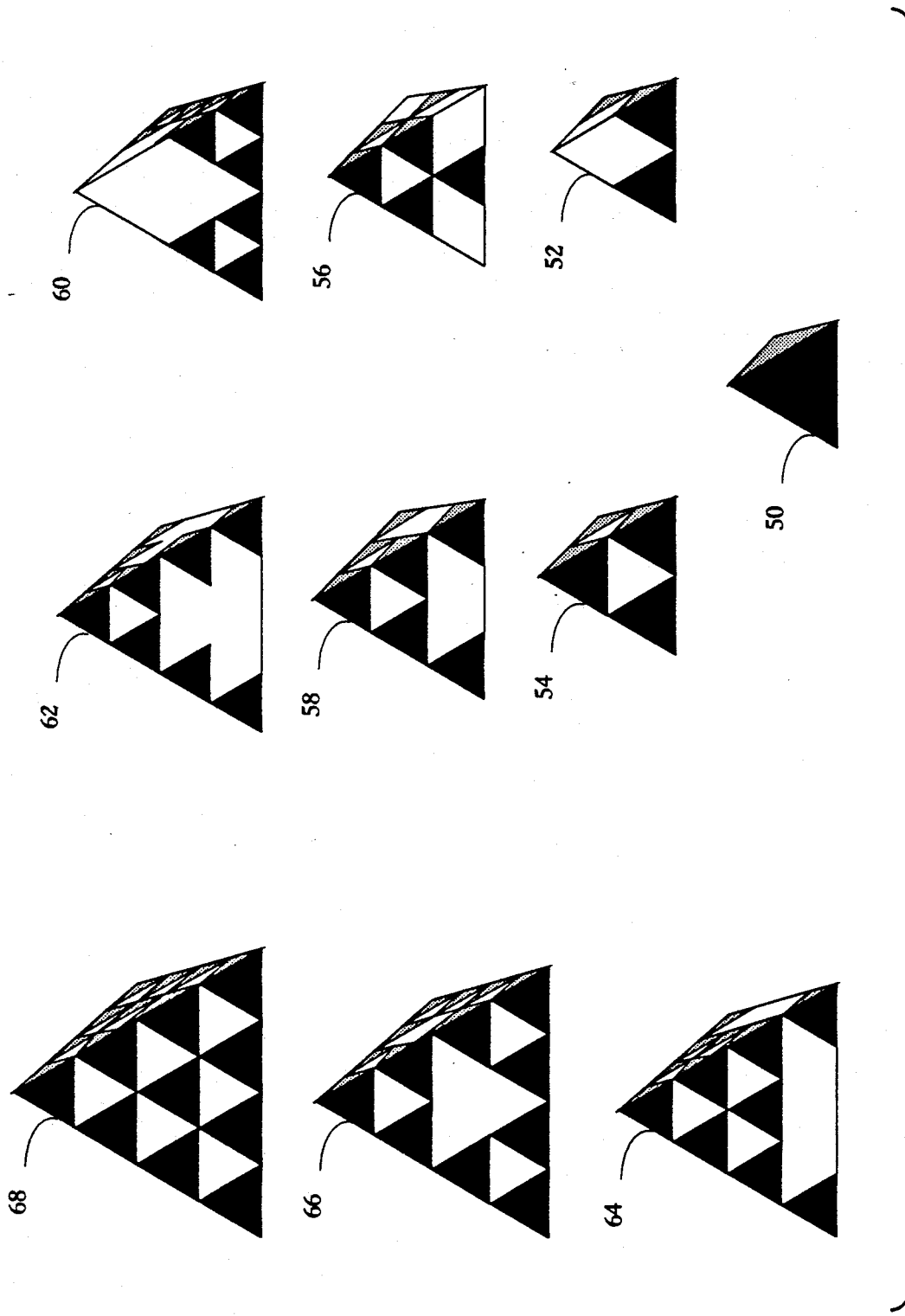

The kit is composed of the Fractal Super Triangles set shown in FIG. 1A, the Maxi Fractal Super Triangles set shown FIG. 1B, the Super Duper Table mat shown in FIG. 1C, the Fractal Super Board shown in FIGS. 1D through 1J or an alternate form of the Fractal Super Board shown in FIGS. 1K–1V, the manipulative super Tokens shown in FIG. 1X, the nesting Super Pyramids set shown in FIGS. 1Y, and the Fractal Super Pyramids set shown in FIG. 1Z.

FIG. 1A shows the different components of the Fractal Super Triangles set as follows: The triangular carrying box 1 with an illustration 1a of a super-super in base ten on the front cover and of a super-super in base nine on the back cover (not shown). This box contains all the triangular instruction elements including a Super Book, User's Manual, super Tokens, and a folded Super Duper Table and the Fractal Super Board, as well as all the manipulative triangular components. More particularly, the instruction components of this set are composed of: the Work Book 2 called the Super Book containing a more detailed version of FIGS. 2A-12 of the present patent application in a form so that they can be exactly duplicated using the Fractal Super Triangles, the Super Duper Table, and the Fractal Super Board; a User's Manual 3, based on the method of use section of the present patent application, explaining how to use the Super Book 2 and use the different components to learn various mathematical concepts. The rest of the material which can be manipulated, can be made out of wood, plastic, light metal or pressed cardboard etc. For attaching smaller pieces to the larger ones hook and loop fasteners, e.g. Velcro, or plastic ridges on larger boards, or magnets etc. can be used. These materials comprise: twelve equilateral triangular boards 4-15 (with sides, for example, 10-16 inches), referred to respectively as Zero, One, Two, Three, Four, Five, Alternate Five, Six, Seven, Eight, Nine and Ten (Super) Boards. On the front, each board has 100 attachment areas 4a. These attachment areas are small equilateral triangles made of female Velcro pieces (alternatively the boards may contain triangular ridges so that smaller triangles may fit inside them or magnets may be used etc.) arranged and fixed to each board in a super-super shape. Each board 4-15 has the outline 5a-15a of the fractal shape of the number that it represents drawn on it, there being no outline for zero on board 4. The backs 4b of all of the boards 5-15 all show a super-super in base ten in black with a smooth surface. The boards are slightly thicker than the manipulative triangular pieces 16-33 which are thin and are all colored in black (or any other color), some of the manipulative pieces having smooth surfaces and some having rough surfaces. The manipulative pieces include medium and small equilateral triangles 16 and 26, representing one, with a rough surface (ten of each preferably included in the kit). Extra colored or white triangles can be included, in particular for the Fractal Game. On the reverse side and center of the medium triangle 16, a piece 16a of male Velcro the size of a small triangle 26 is attached, so that the medium triangle 16 can be attached to any of ten female pieces 4a of Velcro arranged in a triangle on each of the twelve boards 4-15. Alternatively, ridges or magnets can also be used. The reverse side of the manipulative elements 17-33 has a similar piece of male Velcro, or other attachment device, defining an attachment area at the center of each medium triangle or covering each small triangle that make up the triangular shape, so that each shape has as many attachment points as it has triangles. The manipulative pieces further include: medium and small shapes 17 and 27 (seven medium and forty small ones), representing the number two, and having a smooth surface. The two medium triangles in the medium manipulative piece 17 are held together by means of a fastener 17a made out of resilient plastic, which can be transparent or of the same color as the said medium triangles, with a small triangular cut in its center which can fit at the bottom of the said two triangles to give the visual image of two connected triangles. The fastener 17a is a one-piece resilient clip having an integral hinge along one side and edges along the sides having the triangular cuts, the latter edges being biased toward one another by the hinge. The two triangles in the manipulative piece 17 can also be separated. The two small colored triangles in the small manipulative piece 27 are actually painted or otherwise defined on a trapezoidal piece of cardboard (or other material) and cannot be separated. Medium and small manipulative pieces 18 and 28, representing the number three (six medium and thirty small ones) have a rough surface. The three medium triangles in the medium manipulative piece 18 are held together by means of three fasteners 17a which connect on the outside edges of each pair of adjacent medium triangles. The three small colored triangles in the small manipulative piece 28 are actually defined on a larger triangular piece of cardboard (or other material) and cannot be separated. Medium and small shapes 19 and 29 representing the number five (one medium and ten small ones) have a rough surface. The five medium triangles in the medium manipulative element 19 are held together by means of two fasteners 19a like the fasteners 17a but each long enough to connect the three medium triangles along each side of the medium manipulative element 19. One fastener 17a connects the two medium triangles underneath the top most medium triangle in the element 19. The five small colored triangles 29 are actually defined on a larger generally triangular piece of cardboard (or other material) and cannot be separated. Medium and small manipulative elements 20 and 30 (one medium and ten small ones) represent an alternative arrangement for the number five, and have a rough surface. The five medium triangles in the element 20 are held together by means of a fastener 20a like fasteners 17a and 19a but long enough to connect the bottom four medium triangles and two fasteners 17a connecting the top triangle to the center of the bottom row of medium triangles. The five small colored triangles in 30 are actually defined on a larger piece of cardboard (or other material) and can not be separated. Medium and small manipulative elements 21 and 31 (one medium and ten small ones) represent the number seven and have a rough surface. The seven medium triangles in the element 19 are held together by means of two fasteners 20a each connecting the four medium triangles on each side of the element 21, and one fastener 17a connecting the two medium triangles underneath the top most medium triangle in the element 21. The seven small colored triangles of the element 31 are actually defined on a large piece of cardboard (or other material) and can not be separated. Medium equilateral triangular manipulative element 22 is composed of ten small equilateral triangles having a smooth surface and making a super (ten triangles). Medium and small triangular manipulative elements 23 and 32 are illustrative examples of a set of manipulative elements (one medium set and one small set) which show the mathematical symbols "=", "+", "−", "×", "/", ".", "*", "**", "√", ">", "<" on one side and are blank on the other side. Medium and small triangular manipulative elements 24 and 33 (one medium set and three small sets) show the numbers 0 to 9, and medium manipulative elements 25 (three triangles) have ten attachment areas containing female Velcro for the releasable attachment of smaller triangles.

FIG. 1B shows the different components of the set of Maxi Fractal Super Triangles which is a simplified and slightly altered version of the Fractal Super Triangles set, as follows: The triangular carrying box 1' with a super in base ten on the front cover and a super in base nine on the back cover (not shown). This box can contain all the triangular instruction elements including the Super Book, User's Manual as well as all the manipulative triangular elements. The instruction components of this set are composed of: the Work Book 2' called the Super Book, containing a more detailed version of FIGS. 2A-12, of the present patent application in a form so that they can be exactly duplicated with the Maxi Fractal Super Triangles set, and a User's Manual 3', based on the method of use section of the present patent application, explaining how to use the Super Book and the different components to teach various mathematical concepts. The rest of the materials which can be manipulated can be made out of wood, plastic, light metal or pressed cardboard etc. These materials consist of: twelve equilateral triangular boards 4'-15' (with sides 8-16 inches), referred to respectively as the Zero, One, Two, Three, Four, Five, Alternate Five, Six, Seven, Eight, Nine and Super Boards. On the front cover, each board has 10 sunken triangles so that the rest of the triangular pieces can be placed in these places. Each board has drawn on it the outline of the fractal shape of the number that it represents. The back covers of all the boards all show a super in base ten in black with a smooth raised surface. 120 medium equilateral triangles 16' representing one, with a black rough and smooth surface on one side and on the other side three sets of the numbers 0 to 9, and one set of mathematical symbols "=", "+", "−", "×", "/", and colored or blank triangles for use, in particular, in the Fractal Game. These triangles have six holes 16'a near their vertices so that they can be attached together by means of the attachment rods 22' to make up: a representation of two 17', three 18', five 19', alternate five 20', and seven 21'. 150 rods 22' are provided for attaching the triangular pieces together. The back sides 23' of medium triangles 16' show the mathematical symbols "=", "+", "−", "×", "/". The back sides 24' of medium triangles 16' show the numbers 0 to 9 repeated three times.

The Super Duper Table 50 in FIG. 1C is a large, light weight, white or light gray colored mat (could be made out of plasticized material for resistance), preferably in the range of approximately 3 by 6 feet to 12 by 15 feet. This mat has eleven columns 51a-61a, and eleven rows 51b-61b. The first column 51a and the first row 51b contain the fractal representations of the numbers One to Ten and serve as references. The body of the table consists of 100 cells each at the intersection of a particular row and a particular column. Each cell contains a different arrangement of fractal shapes produced by sewing small equilateral triangles made out female hook and loop fasteners in a particular arrangement. As an alternative, Velcro can form the entire surface of the mat, and the triangles on the mat can be defined by contrasting color. The fractal arrangement for each cell is an arrangement, into the fractal shape of the row reference number, of as many (as the row number) replicas of the column reference number. For example the fractal arrangement in column 54a and row 56b, is an arrangement of 5 three shapes into a five shape. In particular, the cell column 61a and row 61b is identical to 4a in FIG. 1A. The manipulative elements 16-33, and specifically, the small manipulative elements 26-30 can be attached to the designated shapes on the Super Duper Table. The rows 52b-61b in the Super Duper Table are called the One Row, Two Row, . . . , Ten (super) Row, and the columns 52a-61a are referred to as the One Column, Two Column, . . . , Ten (Super) Column.

A Fractal Super Board shown in FIG. 1D-1J is composed of: a large equilateral triangular element 4" shown in FIG. 1D which has considerable thickness and a triangular well and groove system 4"a. The well and groove system 4"a includes a plurality of wells of generally circular cylindrical shape extending into the board 4" from one surface and defining a triangular pattern. Each well terminates at its lower end in a spherical chamber. The wells are interconnected by a network of grooves to define a plurality of equilateral triangles on the board. As can be seen from FIG. 1E, which is a cross section taken along the line 1E—1E in FIG. 1D, each groove has a cross section including a relatively narrow upper, neck portion in alignment with the upper portions of the wells, and a lower, slightly enlarged generally cylindrical portion in alignment with spherical portions of the wells. FIG. 1E is a side view of the triangular elements 4" of FIG. 1E. FIG. 1G is a plan view of one of ten triangular elements 25" provided with the triangular element 4". Each triangular element 25" is provided with a triangular well and groove system 25"a like the system 4"a but on a smaller scale. A side view of a triangular element 25" is shown in FIG. 1H which also shows a cylindrical stem 25"b projecting from the back and ending in a ball that can be inserted into any of the wells of the wall and groove system 4"a. The ball can subsequently move along the grooves so that the element 25" can be placed in any of the ten wells. One hundred (100) equilateral triangular elements 16", one of which is shown in FIG. 1I, are each marked with a circle 16"a. FIG. 1J is a side view of the triangular element 16" of FIG. 1I, showing a stem 16"b which is a replica of the stem 25"b on a smaller scale and has a ball on the end so that the stem 16"b can be inserted into the well and groove system 25"a and moved around.

An alternate Fractal Super Board 4''' and associated elements are is shown in FIGS. 1K-1V. FIG. 1K is a plan view of a large equilateral triangular Fractal super Board 4''' having a smooth base that shows the outline of a super 4'''a. Around this base there are three side walls 4'''b each with a dovetail shaped groove 4'''c on its inside surface. A cross sectional view of the groove 4'''c is shown in FIG. 1L and a side view of a side wall 4'''b is shown in FIG. 1M. One of the side walls 4''' has a door mechanism as follows: there is an opening 4'''d in the side wall 4'''b spaced from one of the corners of the Fractal Super Board 4''' by a distance equal to the length of one side of a medium triangle 25'''. A door 4'''q is present in the opening, the door having a dovetail groove like those of the side walls. The door 4'''q is pivotally connected by a hinge 4'''e to corner of the base of the Fractal Super Board 4''', which supports the medium triangles 25'''. When the door 4'''q is open, the medium triangles 25''' and 25'''m can slide in or out of the groove system 4'''c. [To close opening in the side wall, a piece of resilient plastic with two small cylindrical extensions 4'''f will be placed in the two small holes 4'''g around the opening 4'''d.] Ten (10) equilateral medium triangles 25''' shown in FIG. 1N are replicas of the Fractal Super Board 4''' on a smaller scale, each complete with the outline of the super on its base 25'''a, a dovetail shaped groove 25'''c on the inside of a side wall 4'''b, and with a door mechanism 25'''d-25'''g. In addition each medium triangle 25''' has ridges 25'''k on the outside of its three side-walls 25'''b which can fit and slide in the dovetail-shaped groove system 4'''b so that the medium triangle 25''' can be placed into any of the ten upright triangular positions defining a super 4'''a on the base of the large triangular board 4'''. A side view of a medium triangle 25''' is shown in FIG. 10. At each vertex of the medium triangle 25 there is a groove 25'''l, shown in FIG. 1P, so that one medium triangle 25''' can slide next to another medium triangle 25'''. Six (6) equilateral medium triangles 25'''m shown in FIG. 1Q of neutral color have a groove system 25'''n on their outside walls, as shown in FIG. 1R. Each medium triangle 25'''m can be put in the middle of three medium triangles 25''' to make a larger triangle. All the triangles 25''' and 25'''m can be slid into the groove 4'''b from the opened door mechanism 4'''d. When at least one medium triangle 25''' and one medium triangle 25'''m are removed the remaining medium triangles 25 and 25'''n can be moved around in the Fractal Super Board 4'''. One hundred (100) small equilateral triangles 16''' shown in FIG. 1S have ridges 16'''k that are identical to 25'''k and can fit and slide in the dovetail groove system 25'''b so that a small triangle 16''' can be placed into any of the ten upright triangular positions defining a super 25'''a on the medium triangular board 25'''. A side view of a small triangle 16''' is shown in FIG. 1T. At each vertex of the small triangle 16''' there is a groove 16'''l (not shown) so that one small triangle 16''' can slide next to another small triangle 16'''. Sixty (60) equilateral small triangles 16'''m shown in FIG. 1U of neutral color have a groove system 16'''n on their outside walls, as shown in FIG. 1V. Each small triangel 16'''m is a replica of the medium triangle 25'''m on a smaller scale so that each small triangle 16'''m can be put in the middle of three small triangles 16''' to make a larger triangle. All the small triangles 16''' and 16'''m can be slid into the groove 25'''b from the opened door mechanism 25'''d. When at least one small triangle 16''' and one small triangle 16'''m are removed, the remaining small triangles 16''' and 16'''n can be moved around in 25'''.

A Super Tokens set consists of the thick tokens 36–46 shown in FIG. 1X for the numbers one to ten. These tokens are thick enough so that they can stand on their bases, and each pair of complementary numbers (adding up to ten) can fit into each other to make up, in all, six super triangles. The set further comprises three tokens showing the symbols "+", "−", and "=" on one side and blank on the other side. [These nine triangles are arranged into a larger triangle with a transparent triangular cover 34 in FIG. 1A.]

The pyramidal instruction aid, the Super Pyramids shown in FIG. 1Y, consists of ten fitting equilateral pyramids 50-68 that are open on the bottom and can be nested in each other so that the smallest pyramid, which has the fractal shape of the number one on each of its remaining three sides, will fit into the pyramid representing two, etc., so that all the pyramids will eventually fit into the largest pyramid, which bears a super on all sides. These Super Pyramids 50-68 are similar in function to the super Tokens 36-46. In addition, as they are more attractive and can all fit into the largest pyramid, they can be used by smaller children for counting.

The Fractal Super Pyramids in FIG. 1Z comprise a three dimensional embodiment of the Fractal Super Triangles, using a pyramid instead of triangle as its basic unit. It is of particular interest for all ages because of its interesting three dimensional shape. It is made out of the following pieces: one very large equilateral pyramid cover 70 (in plexiglass or other clear material) and a corresponding very large equilateral triangle tray 72 on which six large preassembled and sealed large pyramids 74 can be placed, one large tray 76, which can hold three large pyramids 74, one medium-large tray 78 holding six medium pyramids so, one medium tray 82 for holding three medium pyramids 80, and three small trays 84, 86 and 88 holding respectively, six, three, and one small pyramid(s) 90. Each large pre-assembled pyramid 74 contains ten medium pyramids 80, which in turn are composed of ten small pyramids 90 each, all fixed in place. The ten small pyramids 90 have a transparent pyramid cover 92 that fits into the largest of small trays 84. The ten medium pyramids 80 are covered by a medium transparent pyramid cover 81 that fits into the medium-large tray 78. The ten large pyramids 74 have the very large cover 70 mentioned above.

The Fractal super Triangles, the Maxi Fractal Super Triangles, the Super Duper Table, the Fractal Super Board, the Super Tokens, the Super Pyramids, and the Fractal Super Pyramids are integral parts of the Fractal Mathematics Kit, as will become clear in their Method of Use in the next section.

METHOD OF USE

This invention provides a plurality of instruction aids which are meant to be used by a child directly with minimum help from parents or teachers for mastering basic mathematical and arithmetical skills and concepts. For learning the more complex concepts, e.g. numbers in bases other than ten, roots and powers etc., the child will require a higher degree of coaching from the parents or teachers. Here based on the instruction aids is given an overview and in some cases a description in detail of the method of learning basic mathematical concepts with the Fractal Mathematical Kit. The material is presented in the following order: 1) one-digit numbers—shapes and basic properties; 2) counting and multiple-digit numbers; 3) the four basic operations of addition, subtraction, multiplication and division; 4) bases other than ten; 5) powers, roots, decimals, fractions and ratios; 6) orders of magnitude, limits tending to infinity or zero; and 7) fractal structures. The components of FIGS. 1A through 12 are illustrated schematically to explain the above concepts as it becomes necessary. These concepts and the instructions for mastering them are presented in the Manual 3 and 3', and are illustrated in figures resembling FIGS. 1A through 12 in the super Book 2 and 2'.

1. One Digit Numbers—Shapes and Basic Properties

The Super pyramids in FIGS. 1Y is the first toy that a child, from an early age, can play with to get an idea about numbers and understand counting. The child will become familiar with numbers by counting triangles on a pyramid to find out what number is represented by it. It will become clear that one is less than two as the ore pyramid 50 is smaller than (and fits into) the two pyramid 52, etc. The child can also count the pyramids themselves from one to ten and understand the order of numbers by putting larger triangles on top of smaller ones and realizing that, as the pyramids are stacked, the number that is visible corresponds to the number of stacked pyramids.

The Super Tokens 36–46 in FIG. 1X can also be used from an early age on. In particular the child will notice that a super can be formed from one and nine, two and eight, three and seven, four and six, or five and alternate five. Starting from a super composed of two complementary numbers, the child will see that, if one is taken away from super, nine is left etc. This game is called Making or Breaking a Super and can teach the child the basics of addition and subtraction, for one digit numbers. As we shall see later in FIG. 9A, the same concept is used for simple two- or multiple-digit addition and subtraction.

Figure 2A:
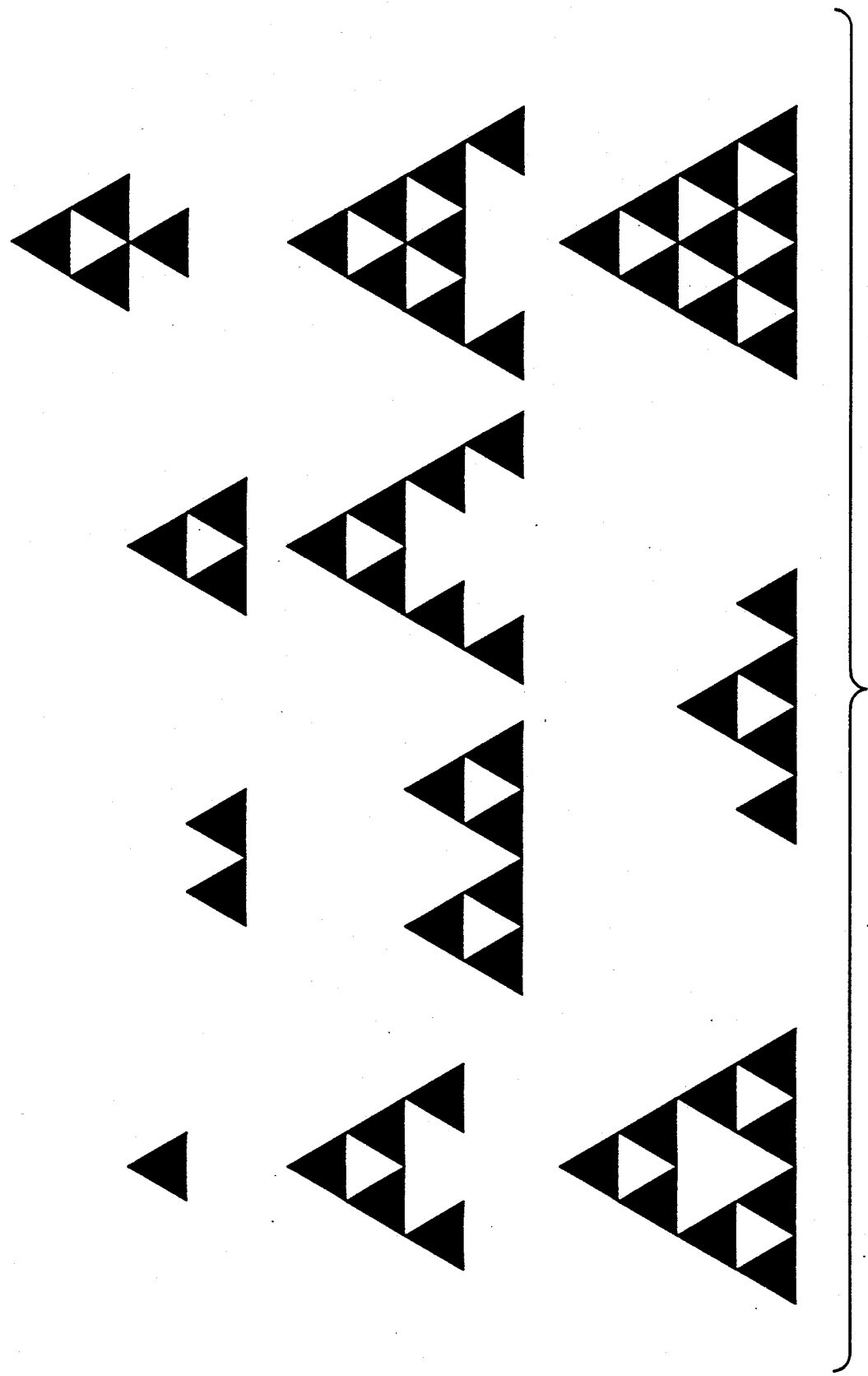
FIGS. 2A–2D are plan views of the preferred shapes for one-digit numbers using a triangular unit base, in accordance with the present invention.
Figure 2B:
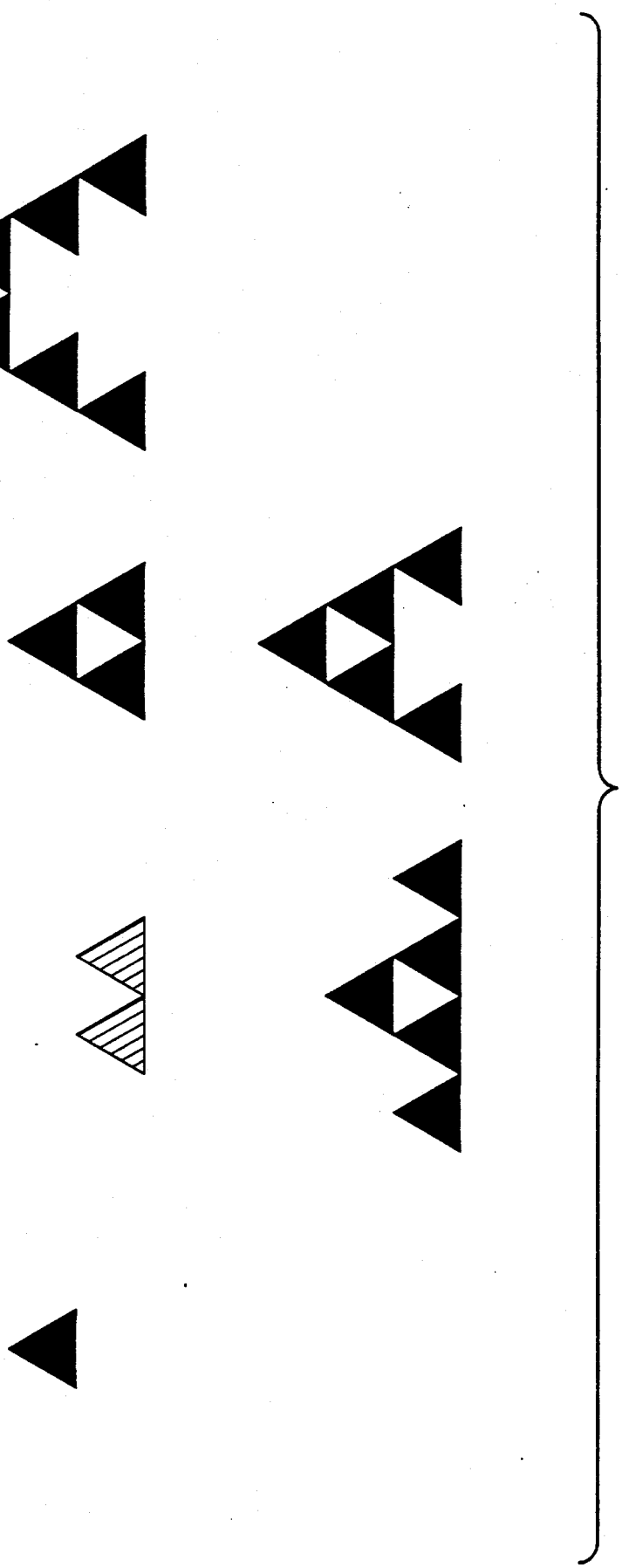
Figure 2C:
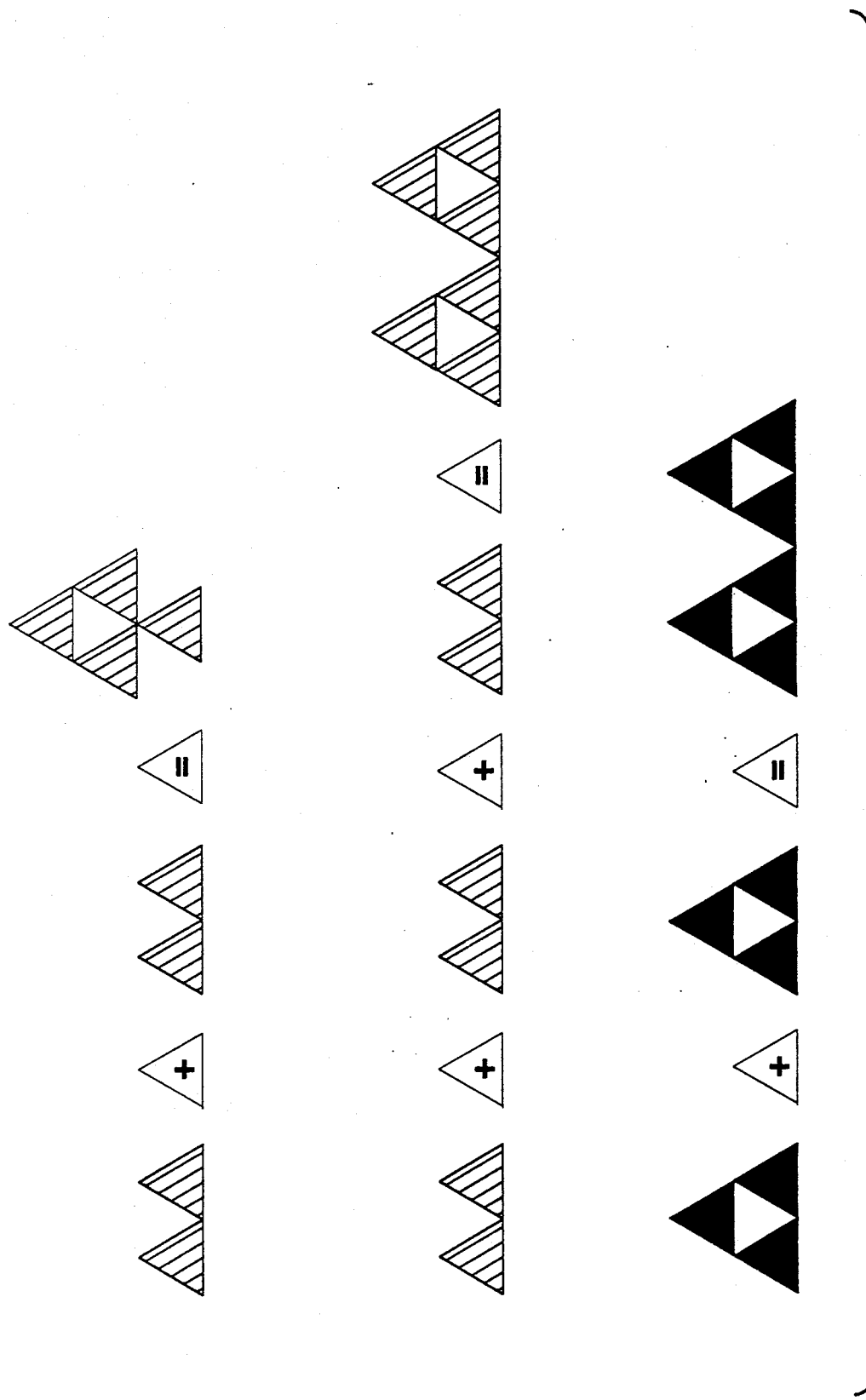
Figure 2D:
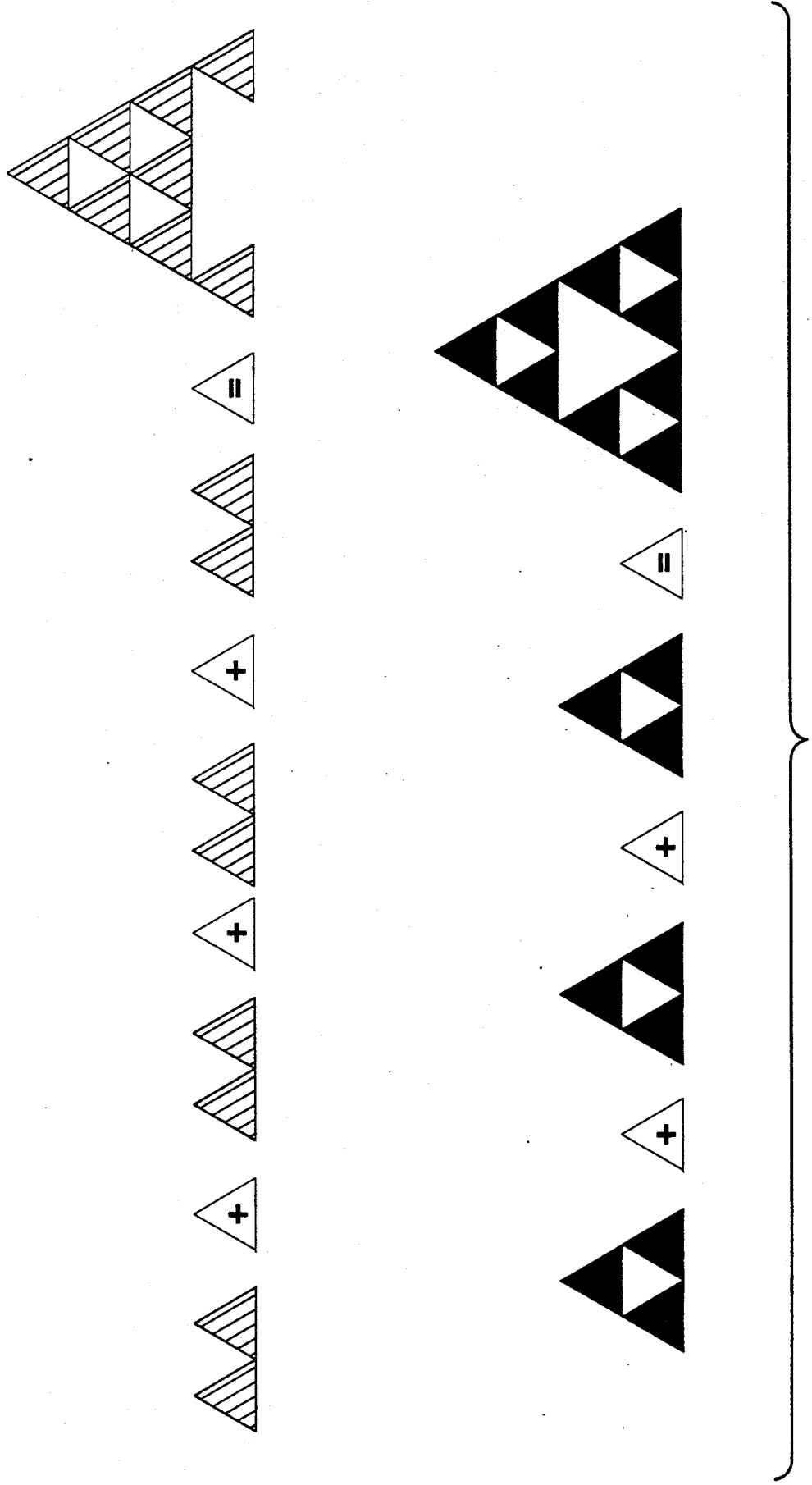

The Fractal Super Triangles set shown in FIG. 1A, and the Maxi Fractal Super Triangles set shown in FIG. 1B, and the Fractal Super Board of FIGS. 1D and 1E are the main instruction aids. The Super Book contains pictures of the boards and the operations that a child can perform with the manipulative pieces. The manual contains a brief and simple description relating to Super Book figures. The child should play with medium sized manipulative pieces and use the outline of numbers on the twelve Boards. Looking at a figure in the Super Book corresponding to FIG. 2A, the child can try to make the numbers one to ten. A figure in the Super Book corresponding to FIG. 2B shows the one digit prime numbers, all in black and with a rough surface texture, except the number two, which has a smooth surface texture. Here the child can distinguish one-digit odd primes, the ones that have a rough surface texture, from two, which is the only even prime and has a smooth surface texture. Figures in the Super Book corresponding to FIGS. 2C and 2D show the child how the compound one-digit numbers are built from the numbers two and three. Again the child will be able to distinguish the odd numbers—the rough family, from the even numbers—the smooth family. FIG. 2C illustrates how the one-digit composite numbers, i.e. four, six, eight and nine, can be constructed from multiple copies of the two shapes or three shapes. These constructions are also excellent exercises for visualization and manipulation of geometric shapes. At this point the child has learned that there are two families: the roughs (odd numbers) and the smooths (even numbers). A super will also be smooth. This is illustrated in the Super Book by a figure showing that super is made out of two shapes in addition to being made out of 2 five shapes. The child can learn that a number which is completely smooth can be made of multiple copies of the two shapes, and it is called even, and that all other numbers are odd.

Figure 3:
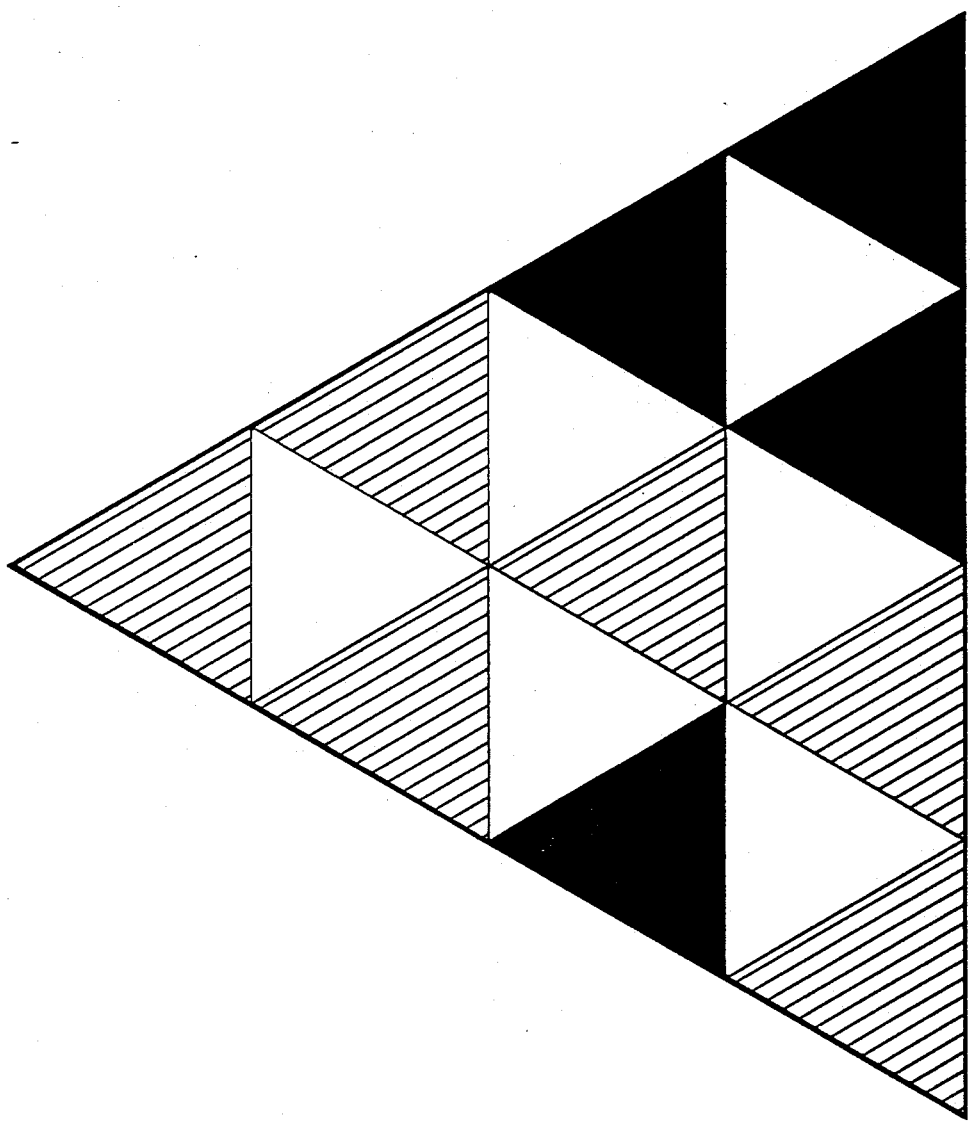
FIG. 3 is a plan view showing how a super (ten in base ten) can be constructed from the numbers one to four.

A figure in the Super Book corresponding to FIG. 3 shows how super can be broken up into the numbers one, two, three, and four. Using this example the following simple game called Let's Make a Super can be played with the medium manipulative pieces 16-21 in FIG. 1A or 16'-21' in FIG. 1B. One to five players can play, and the object of the game is to make 3 supers before the other players. The one-digit prime numbers are distributed so that each player receives the same number of basic units. Each player will receive 2 Boards and the game will be played on the Super Board in the middle. Each player in turn can put down one piece on the Super Board. Each player who can complete a super on the Super Board will receive the pieces and put them on one of his Boards for the first two supers that he completes. The first player who completes the Super Board after having completed his two Boards receives the Super Board and wins the game. A similar game may be played with the small triangles 26-31 in FIG. 1A having as the object the completion of a super-super instead of three supers.

Figure 4A:
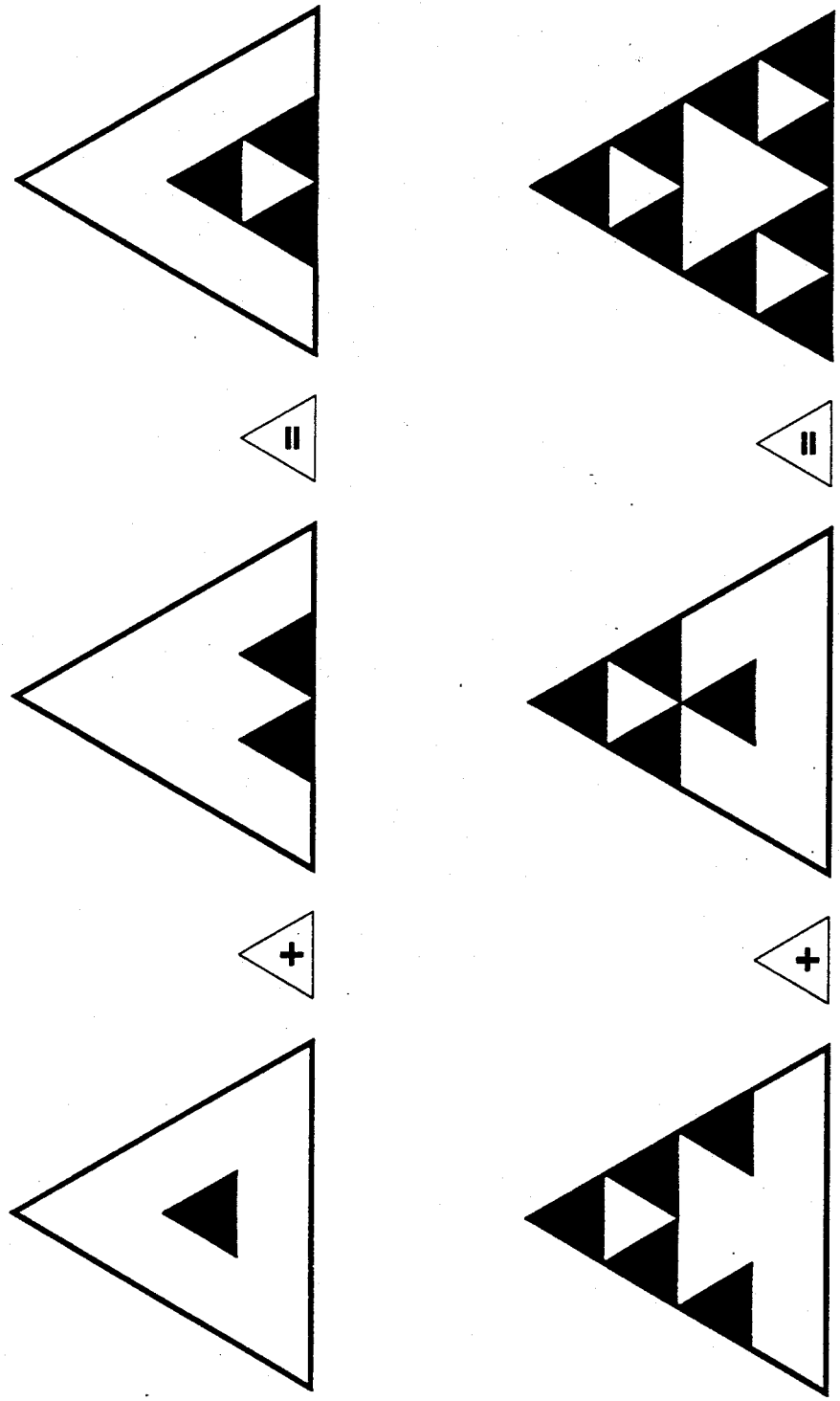
FIGS. 4A–4B are plan views illustrating how one-digit numbers can be added or subtracted.
Figure 4B:
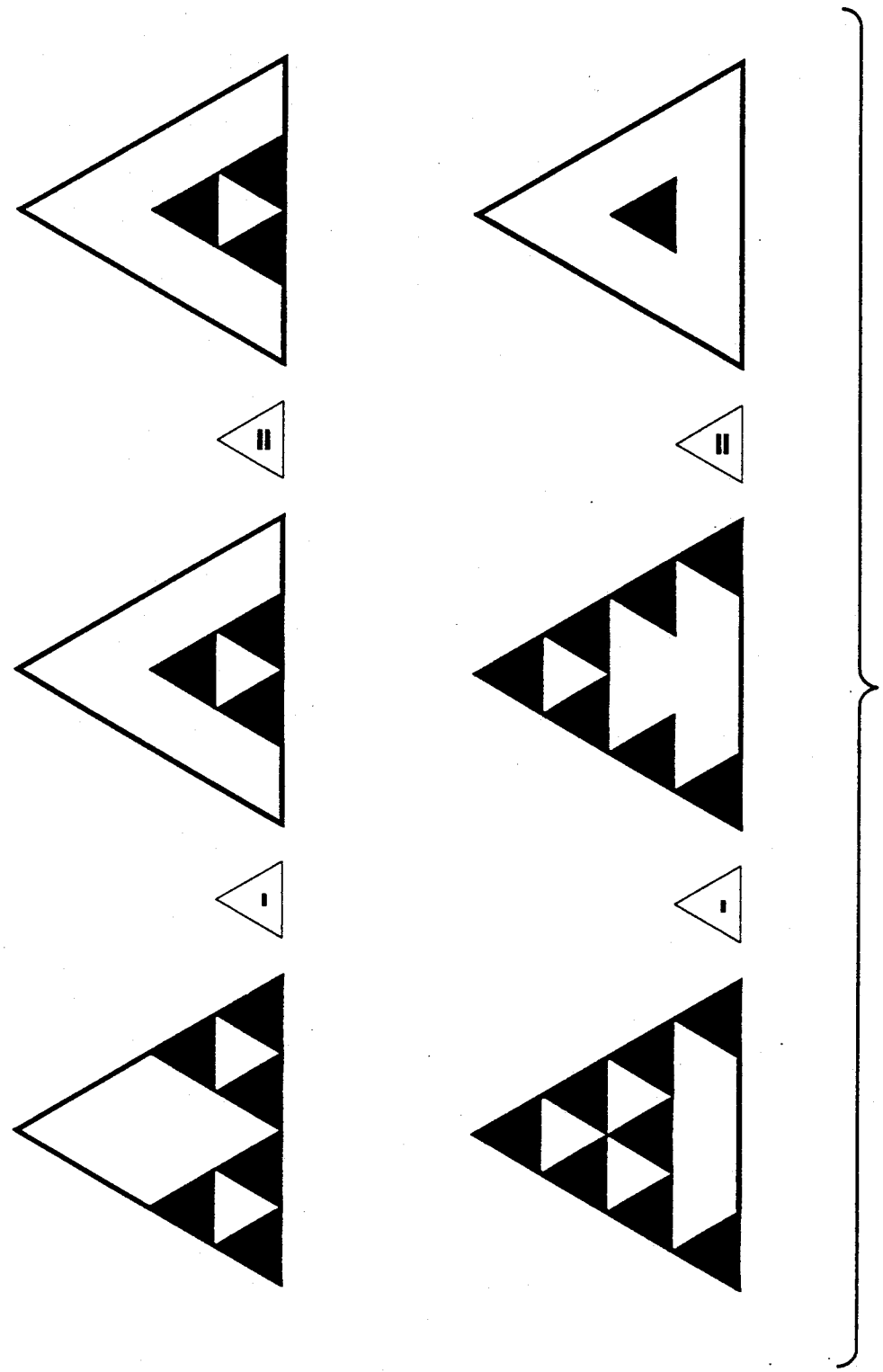

The Super Book also contains figures similar to FIG. 4A showing schematically how one-digit numbers can be added together. The two examples, here, show that one plus two is three and five plus four is nine. To get the result the child will add together the basic units and rearrange them into the right fractal shape of the result. In the process the child can trade in or decompose a larger number to get its equivalent in basic units or other numbers. Other figures in the Super Book, corresponding to FIG. 4B, show schematically how one-digit numbers can be subtracted. Here, the two examples show that six take-away three is three and eight take-away seven is one. The child will actually take away a number of basic units equal to the second number from the first number.

Figure 5A:
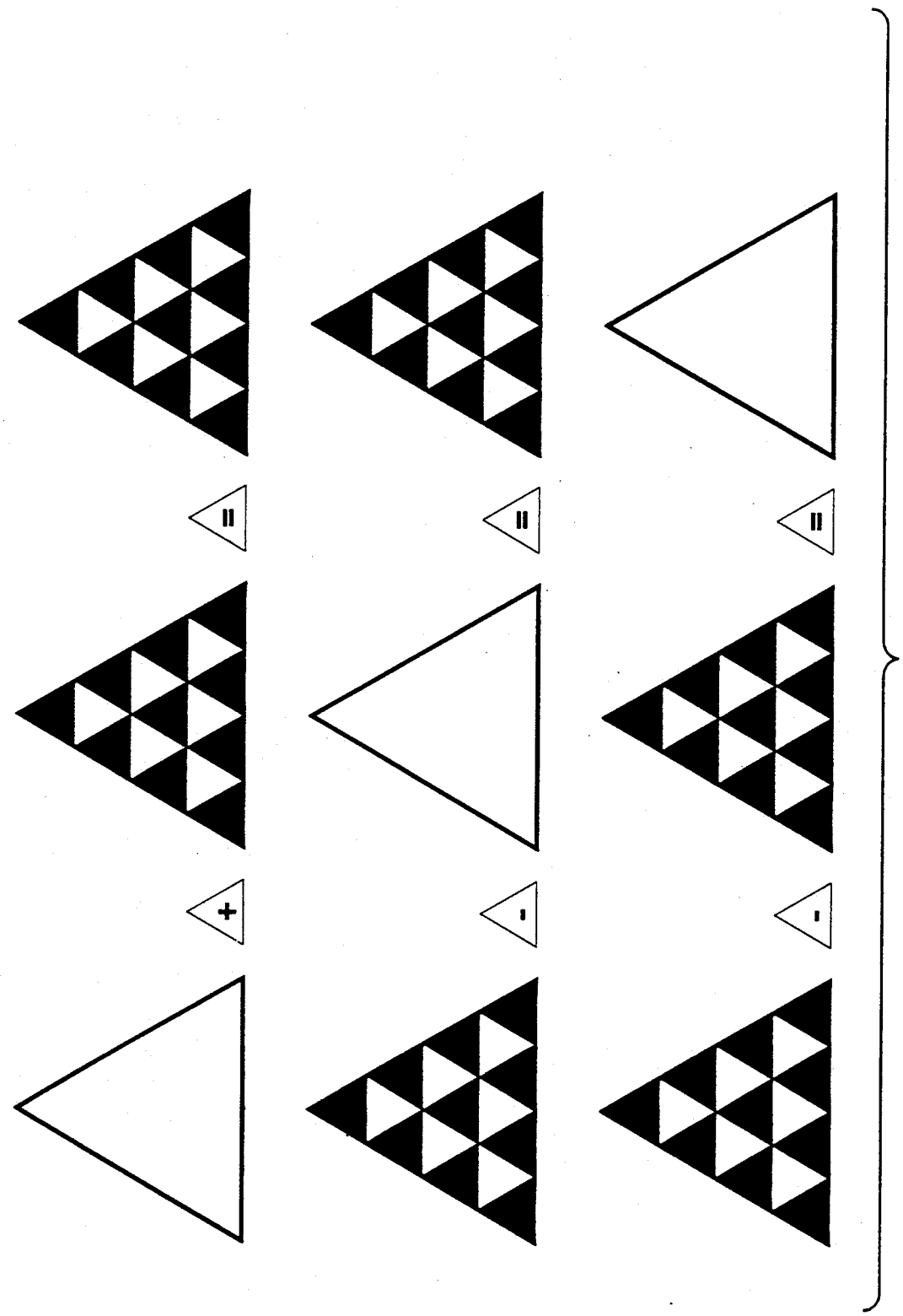
FIG. 5A–5H are plan views demonstrating how a super can be made using complementary one-digit numbers.
Figure 5B:
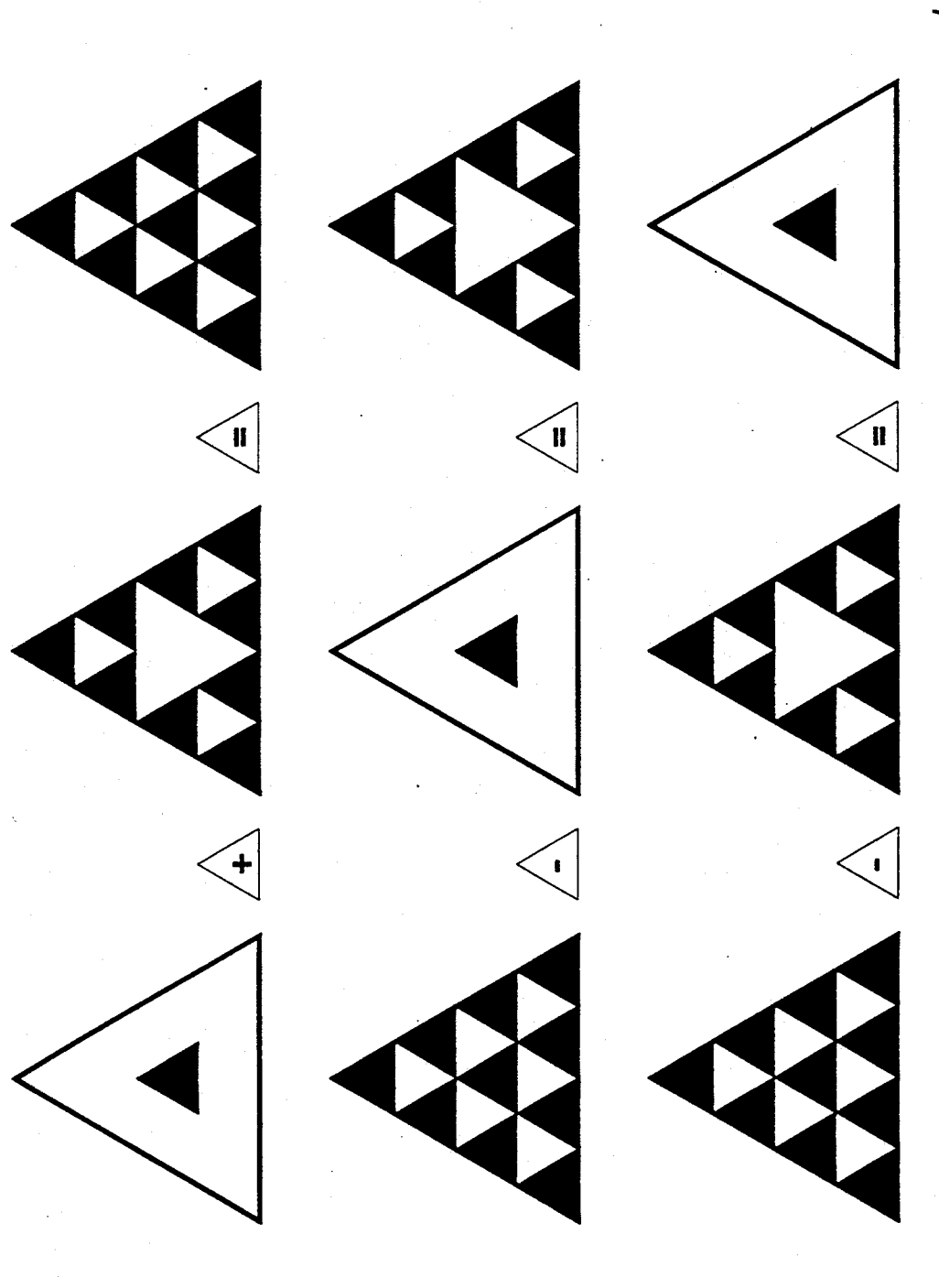
Figure 5C:
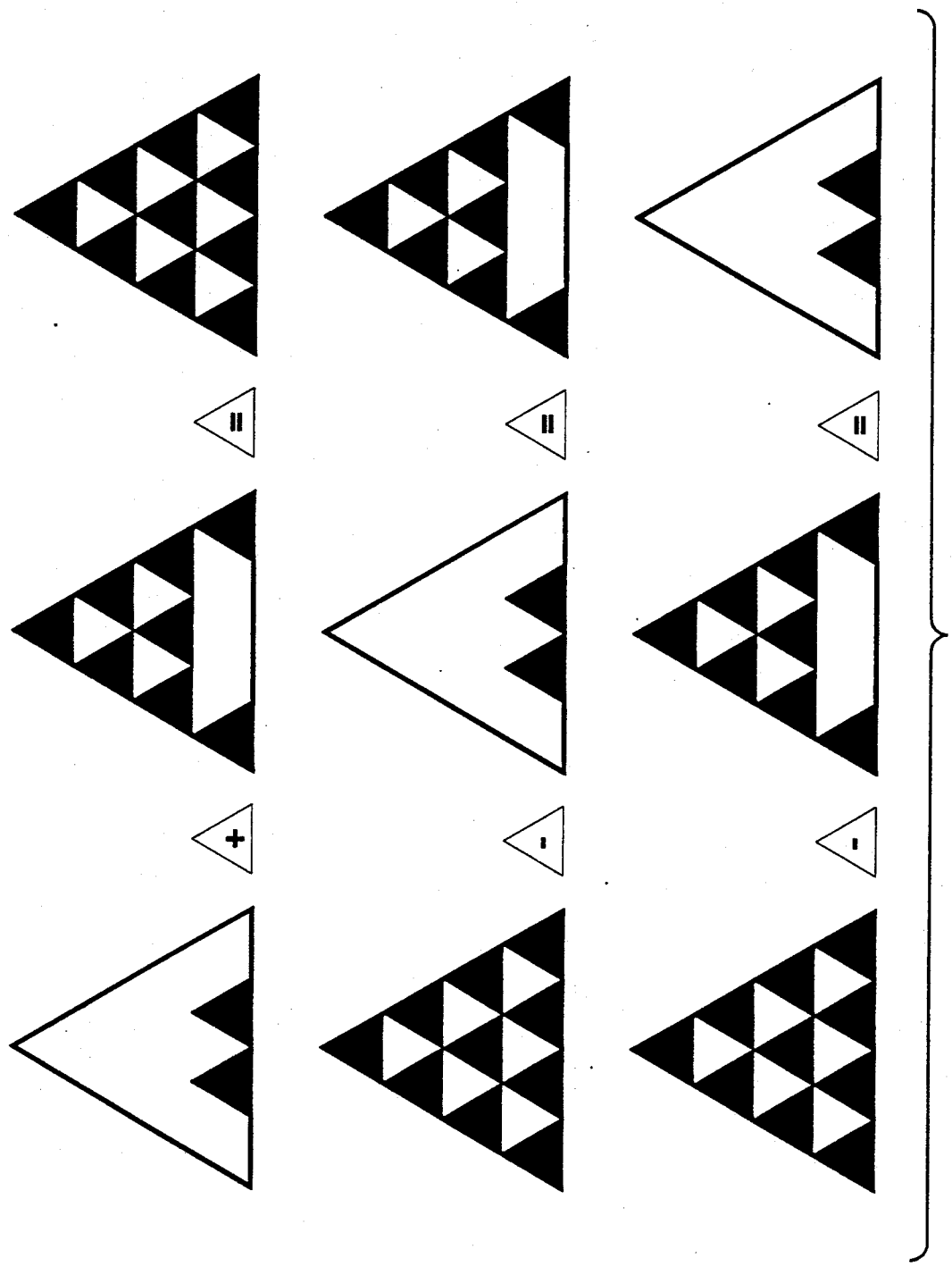
Figure 5D:
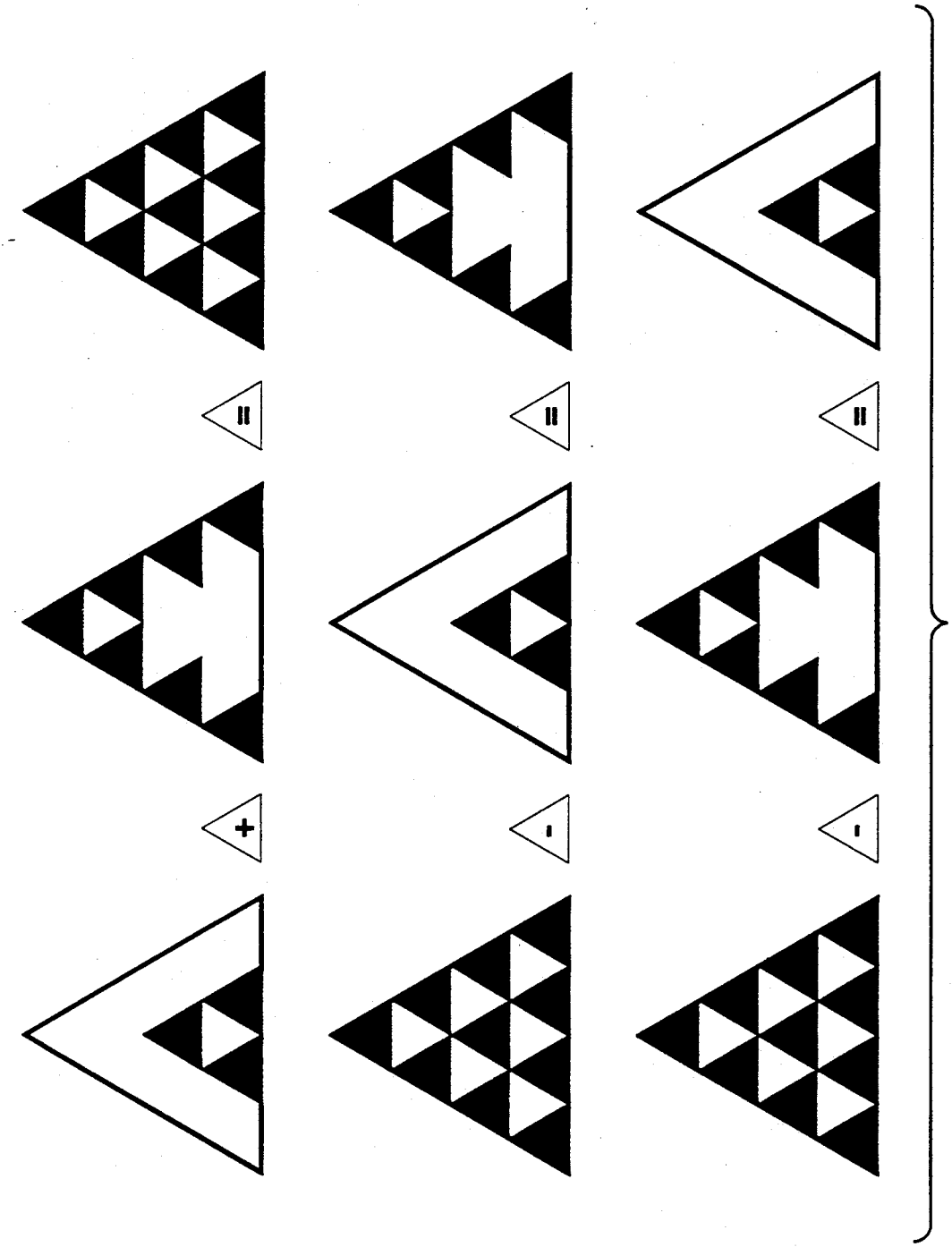
Figure 5E:
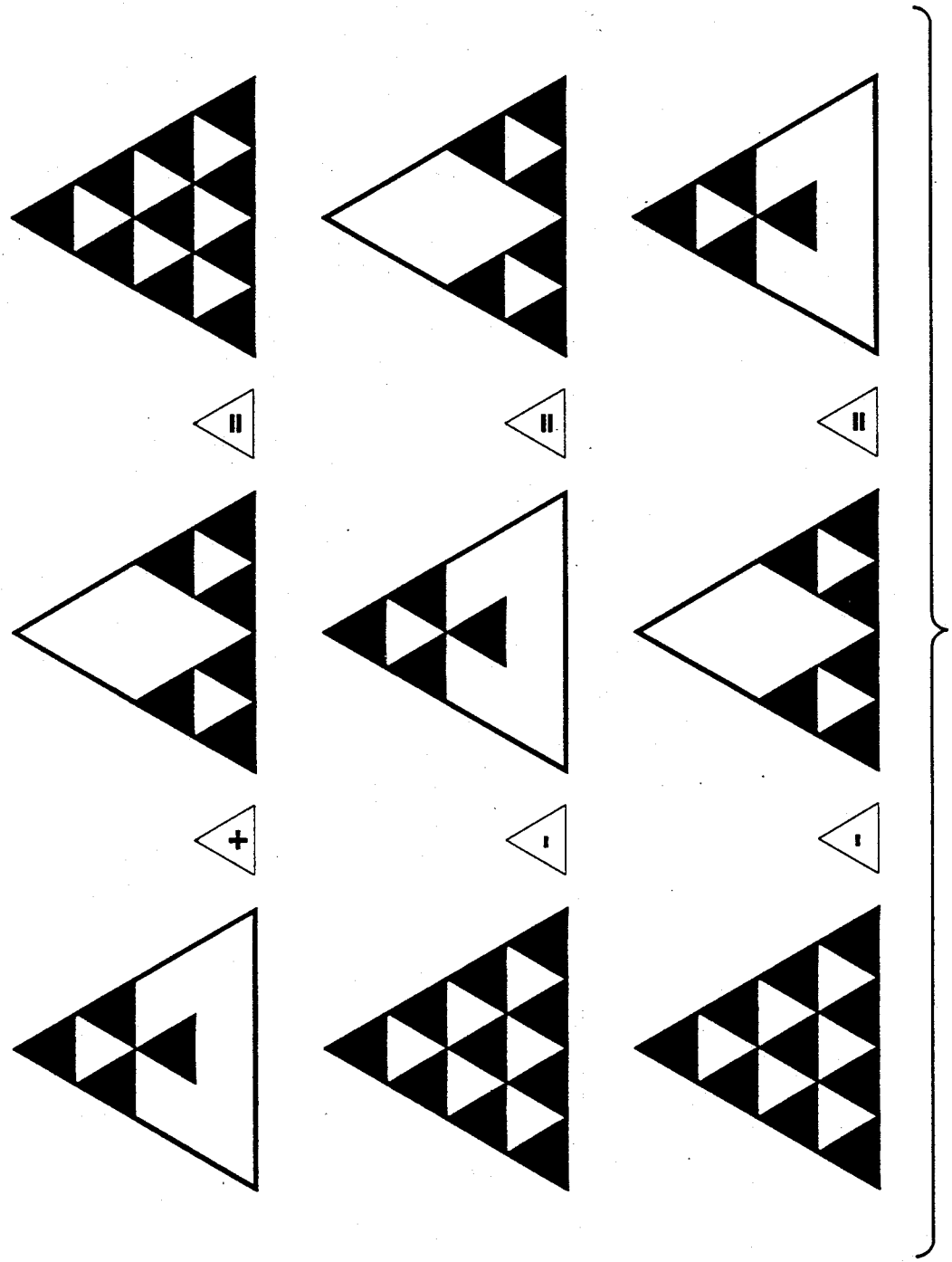
Figure 5F:
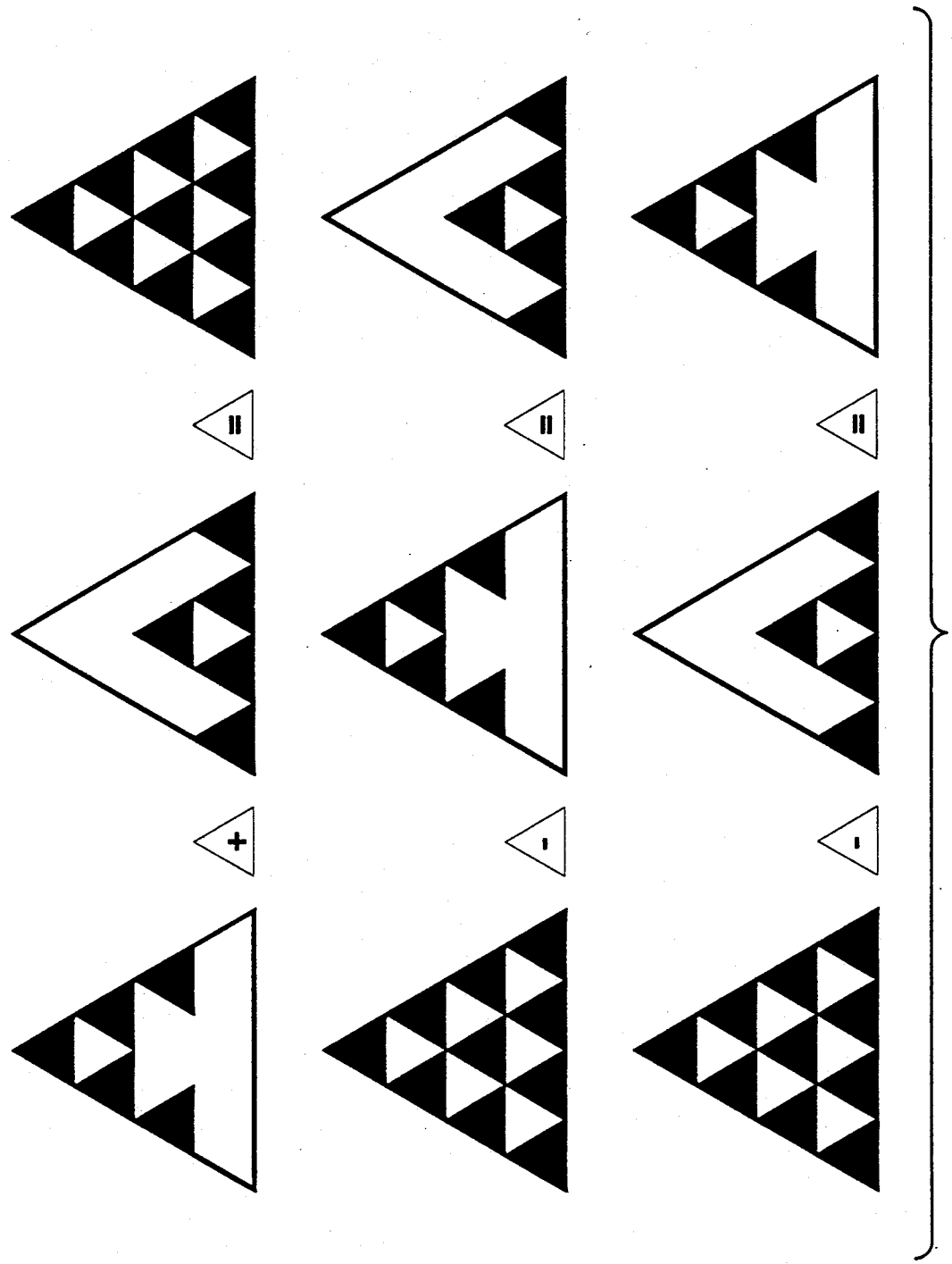
Figure 5G:
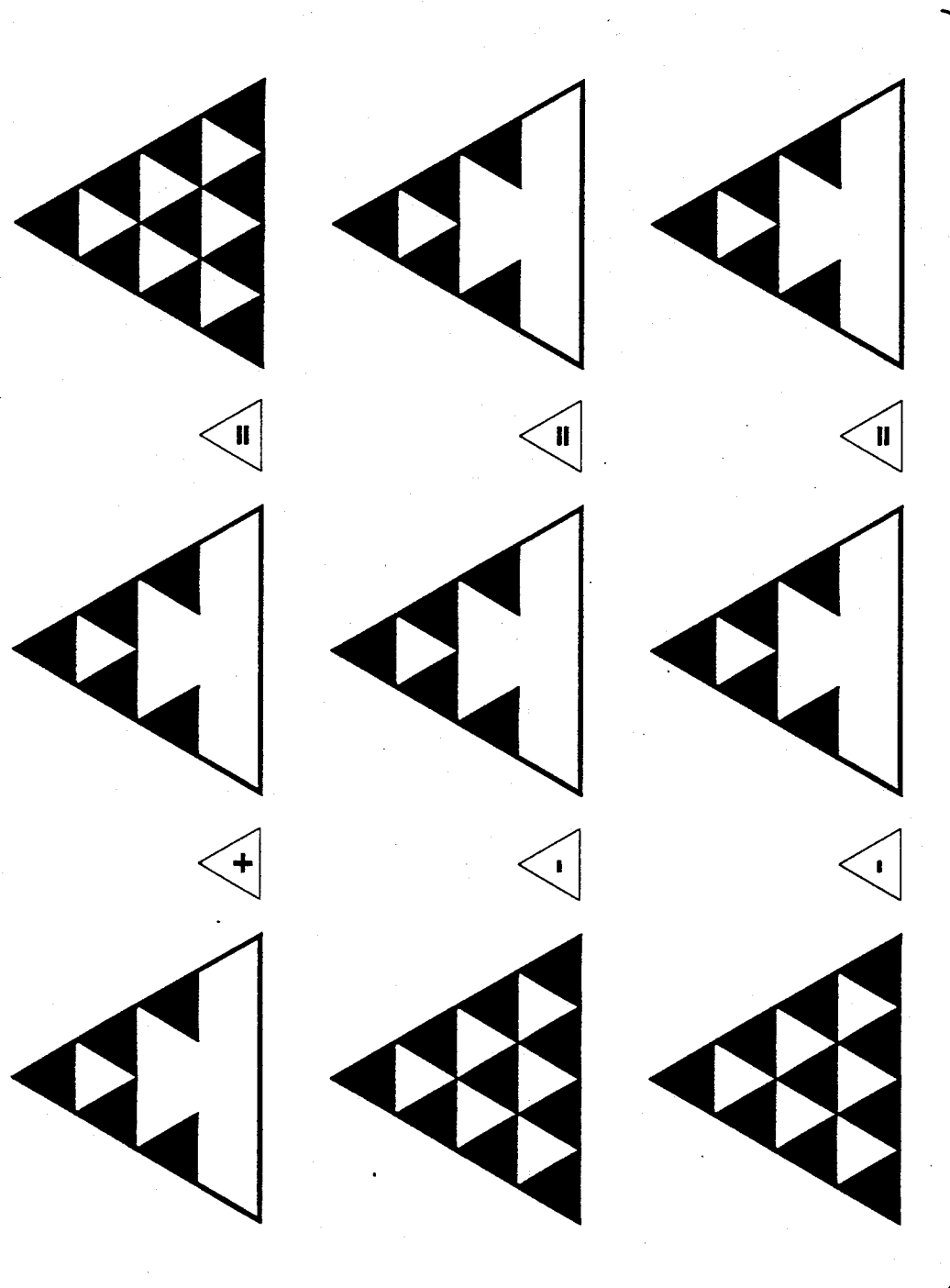
Figure 5H:
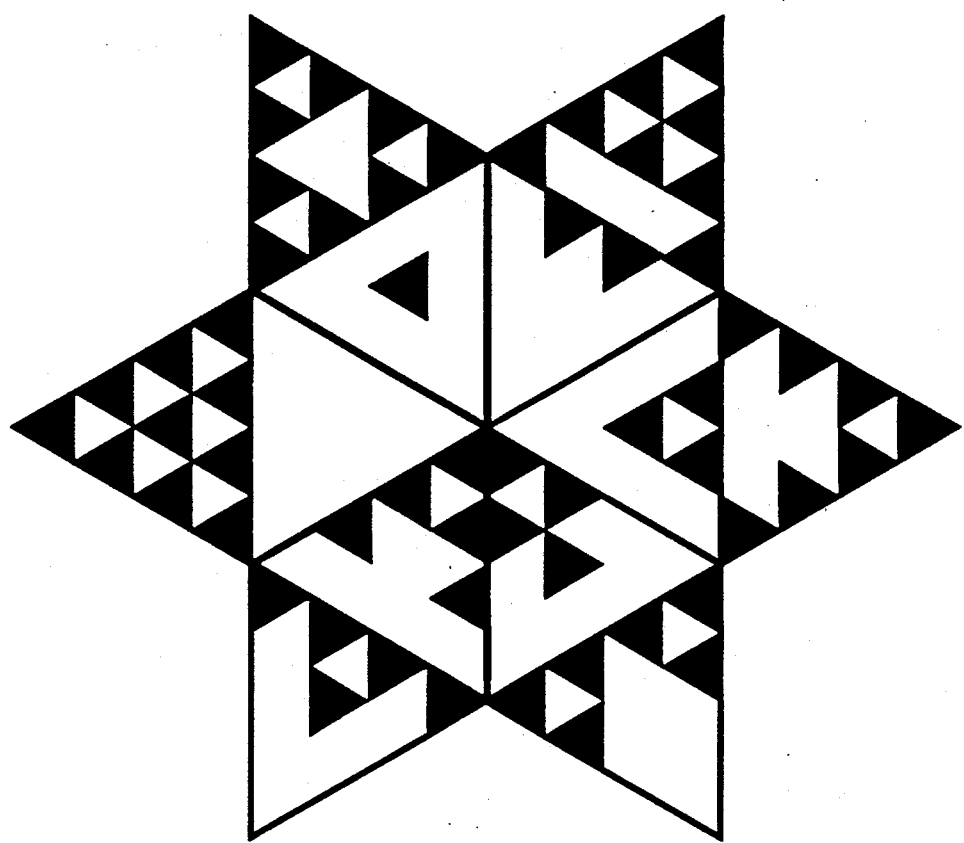

The FIGS. 5A to 5G, and their corresponding figures in the Super Book, show how a super can be made from two complementary one-digit numbers. A child will comprehend that, if one and (plus) nine is ten, then ten take-away (minus) one is nine, and ten take-away nine is one, as shown in FIG. 5B. The child can make these numbers with the medium 16-33 (or 16'-33') or small 26-31 manipulative pieces on any of the Boards 4-15 (or 4'-15'). An interesting game based on the figures in the Super Book and explained in the Manual will present a summarization of the FIGS. 5A through 5G, and is shown, here, schematically in FIG. 5H. First the child will arrange the twelve Boards into a star shaped configuration by arranging clockwise Zero through Five Boards into a hexagon, and by putting Alternate Five through Super Boards clockwise around them so that the sum of every pair of facing Boards is super. Then counting from zero to super the child can put in the corresponding manipulative pieces on the numbers outlined on the Boards. For the numbers four, six, eight and nine, the child will have to construct them from multiple copies of two-shapes and three-shapes. Finally, the child can add each pair of numbers on facing Boards, by manipulating them so as to make six supers on the six Boards making up the hexagon or alternatively on the six outside Boards. And finally, the child can take away numbers from each super the complement of the number outlined in and put the Super Star in its original form. In this process the child can master all the addition and subtraction concepts that are presented in FIGS. 5A through 5G.

2. Counting and Multiple-Digit Numbers

Figure 6:
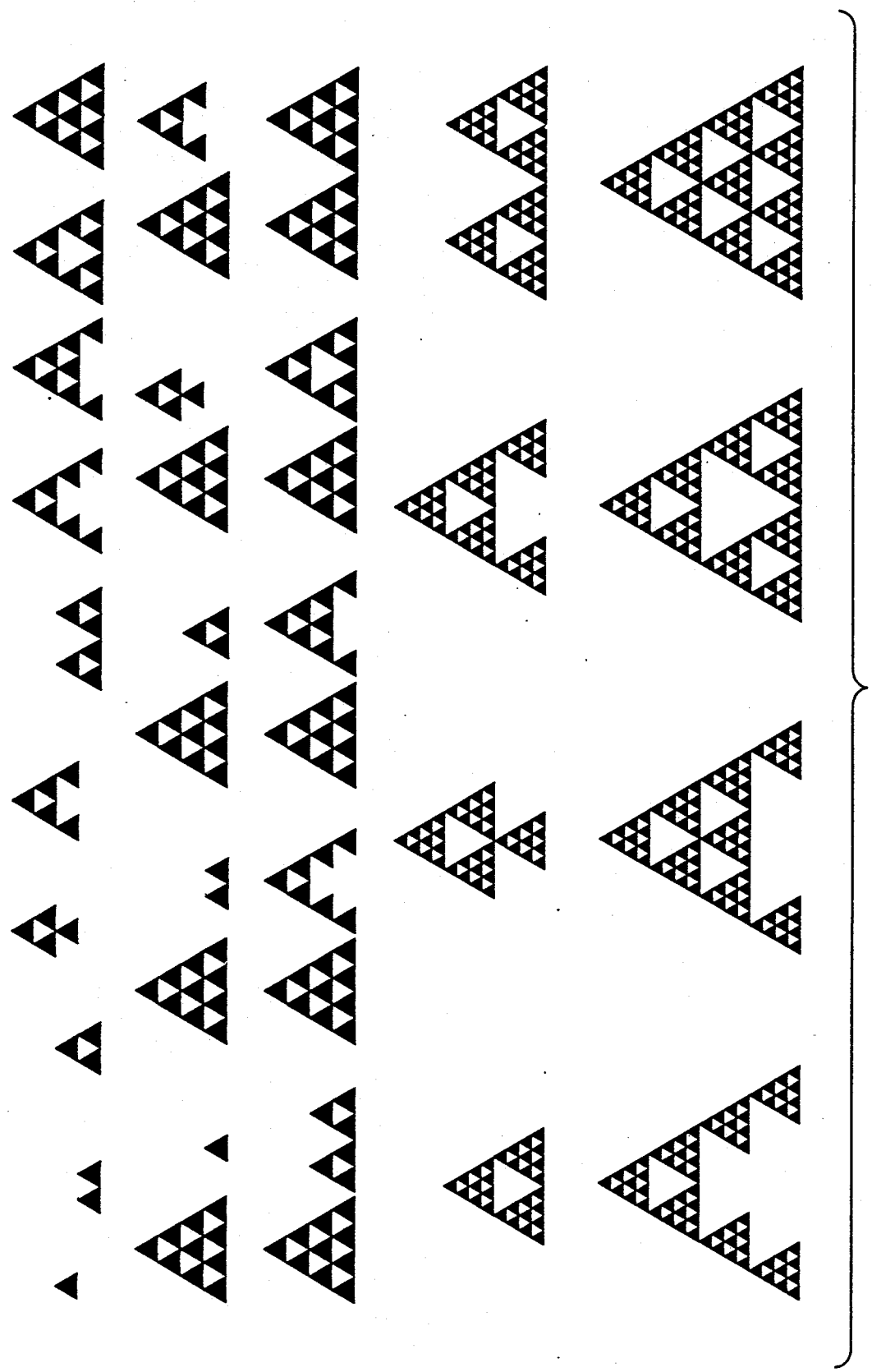
FIG. 6 is a plan view displaying the shapes of the numbers one to super-super (hundred), used in the super method of counting.

The method of counting With the Fractal Super Triangles set or the Maxi Fractal Super Triangles set or the Fractal Super Board is illustrated in FIG. 6 from left to right and from top to bottom. In this method the child will start to count as in the traditional system saying: one, two, three, . . . , nine, but then super! The child is starting with one unit triangle and has eventually appended three more adjacent rows consisting of respectively two, three and four unit triangles to get a super triangle. The name super originates from the fact that a super triangle is a larger replica of a unit triangle; hence one can say that it is a super unit. The child can now use super as a larger unit (super times bigger) for counting. The child can continue in two ways, by ones or by supers. Continuing by ones the child says: super one, super two, super three, . . . , super nine, two super, and then by supers; three super, four super, . . . , nine super and super-super!! The self reproducing, fractal, nature of the method is now becoming evident, and the child realizes that he can continue with super-super as another equivalent, but still larger unit of counting. In other words this new unit is super times bigger than super or super-super times bigger than one as its name suggests in both cases. Now the child can continue by ones, by supers or by super-supers. Continuing by super-supers the child says: two super-super, three super-super, ..., nine super-super and super-super-super. In FIG. 6 a schematic diagram for this counting method is presented, however, the counting is only illustrated up to super-super. The corresponding figures in the Super Book cover five to ten pages, and illustrate counting from one to super-super-super.

The child can master counting also with the Fractal Super Pyramids in a completely analogous manner. Referring to FIG. 1Z, the child counting from one to super will make a medium size super pyramid 80, by first placing six small size unit pyramids 90 into the tray 84, and then placing the tray 86 on top of these six pyramids and putting three more small pyramids 90 in this tray, then the child places the tray 88 on top of these three pyramids 90 and places the tenth pyramid 90 on top, finally the child covers the ten small, pyramids with their corresponding covers 92. The child continues to count to super-super by repeating the same procedure but using medium size super pyramids 80 instead of the small unit pyramids 90 and the correspondingly medium trays 78 and 82 and cover 81. Finally using the large super-super pyramids 74 and large trays 72 and 76 and large cover 70 the child can count to super-super-super.

Using the Super Duper Table, which is illustrated in FIG. 1C, the child can count by ones, then by supers going from left to right in the One Row 52*b* and then top to bottom in the Ten Column 61*a* to reach super-super.

The above method of counting using the Super Fractal Triangles or Super Fractal Pyramids results in a remarkable self-similar i.e. fractal method of counting which produces remarkable and striking fractal shapes for numbers. Reconsidering the above method, it becomes evident that the progression of numbers from one to super is identical to the progression of numbers from super to super-super and from super-super to super-super-super. The child intuitively absorbs this uniformity of progression and comprehends that if one is able to count to super then one is able to count, for all practical purposes, indefinitely. In other words counting by ones or by supers or by super-supers is the same task with only larger and larger fractal (self-similar) units not requiring any new concepts of nomenclature as is the case in the regular ordinal counting.

Writing and Reading Numbers

Figure 7:
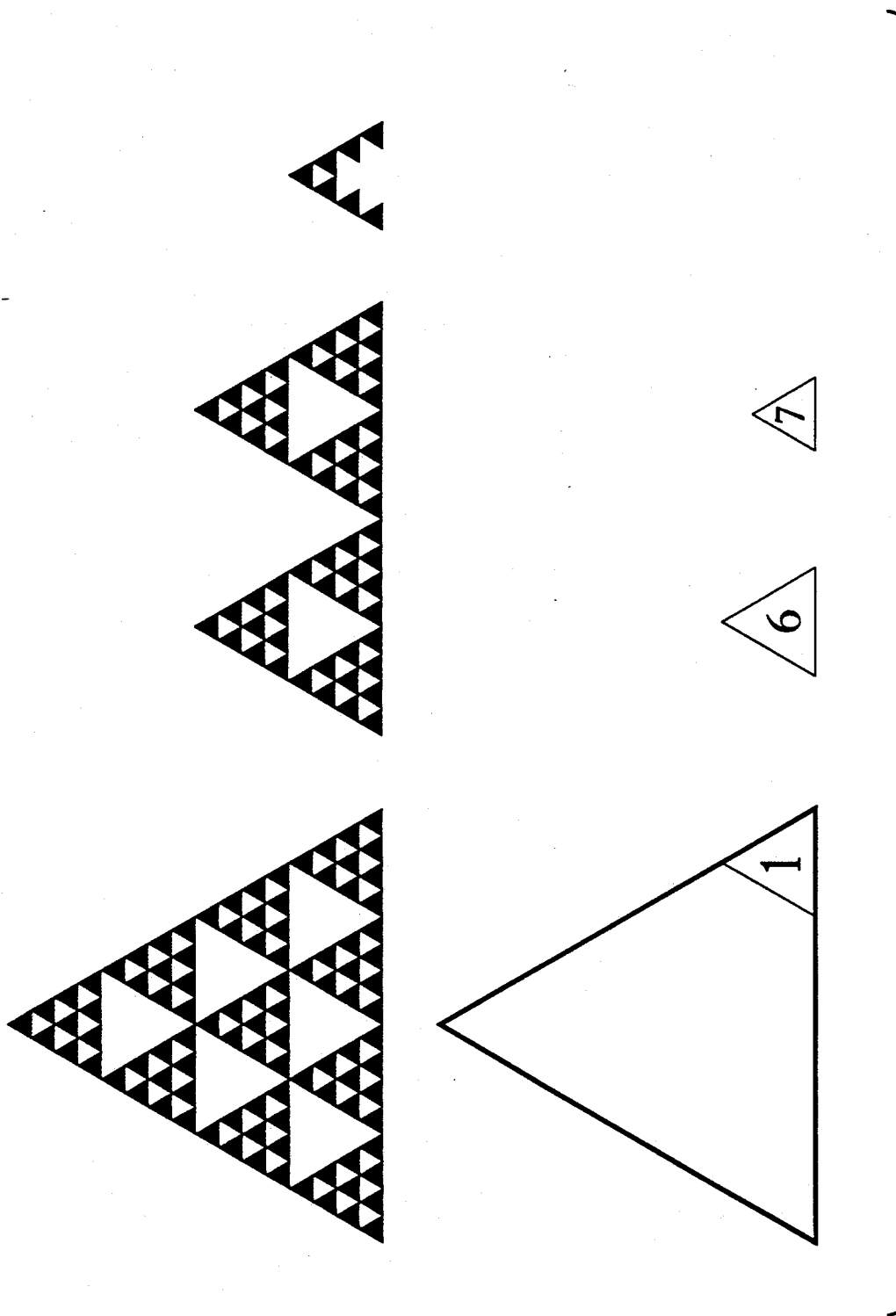
FIG. 7 is a plan view illustrating the formation and the naming method for multiple-digit numbers.

We can use the Fractal Super Triangles or the Maxi Fractal Super Triangles to teach the child how to write multiple-digit numbers and understand what they mean. The method illustrated in FIG. 7, with corresponding figures in the Super Book for one- two-and three-digit numbers, for a three-digit number is as follows: (i) The child assembles the number with super-super triangles to the left of the super triangles which are themselves to the left of the unit triangles. (ii) Then, the child places a blank super-super triangle, super triangle and unit triangle, respectively, underneath the parts of the number which are made of super-super triangles, super Triangles and unit triangles. (iii) Now the child places the figures—these figures are available on the reverse side of the unit triangles—corresponding to the number of units, supers or super-supers in the corresponding blank triangles. (iv) Reading the number in super language will be done from left to right i.e from the biggest to the smallest. Referring to FIG. 7 the displayed number is written as 167 and is read as one "super-super six super seven". The "1" can alternatively be read only as "super-super".

In this method the child always uses three frames for writing three-digit numbers and if the fractal representation does not contain any super or unit triangles this absence will be marked with a zero and the child ignores this level while reading the number, e.g 207 is read two super-super and seven.

As soon as the child can read and write three-digit numbers, the child can learn to read and write numbers with any number of digits. What will become apparent to the child is that super is one followed by 1 zero, super-super is one followed by 2 zeros, super-super-super is one followed by 3 zeros, ..., and super-super-super-super-super is one followed by 6 zeros!

Once a child has learned to count in the super language it will be easy to introduce the regular names for numbers with the explanation that the languages, unlike the number system, are not completely orderly. We can proceed as follows zero is zero, one is one, two is two, ..., nine is nine, super is ten, super one is eleven, super two is twelve, ..., super nine is nineteen, two super is twenty, ..., nine super is ninety, super-super is one hundred, two super-super is two hundred, ..., nine super-super is nine hundred, super-super-super is one thousand, ..., and even super-super-super-super-super-super is a million!

Once the association between super and ten and super-super and hundred is made, then the same system can be used for reading the number in FIG. 7 as one hundred and sixty seven.

3. The Four Basic Operations

The four basic operations of addition, subtraction, multiplication and division can be mastered using the Fractal Super Triangles 4-34, the Maxi Fractal Super Triangles 4'-24', the Super Duper Table 50, the Fractal Super Board 4''-25'' or 4'''-25''', the Super Tokens 36-46, the Super Pyramids 50-68, and the Fractal Super Pyramides 70-92. In this section we present an illustration for each operation. In all these illustrations the child will use the manipulative pieces to get to the desired result. The Super Book contains several illustrations corresponding to the FIGS. 8, 9A, 9B, 10A, 10B, and 10C which are used here as illustrations. The Manual contains sufficient explanation for all these illustrations.

Addition

Figure 8:
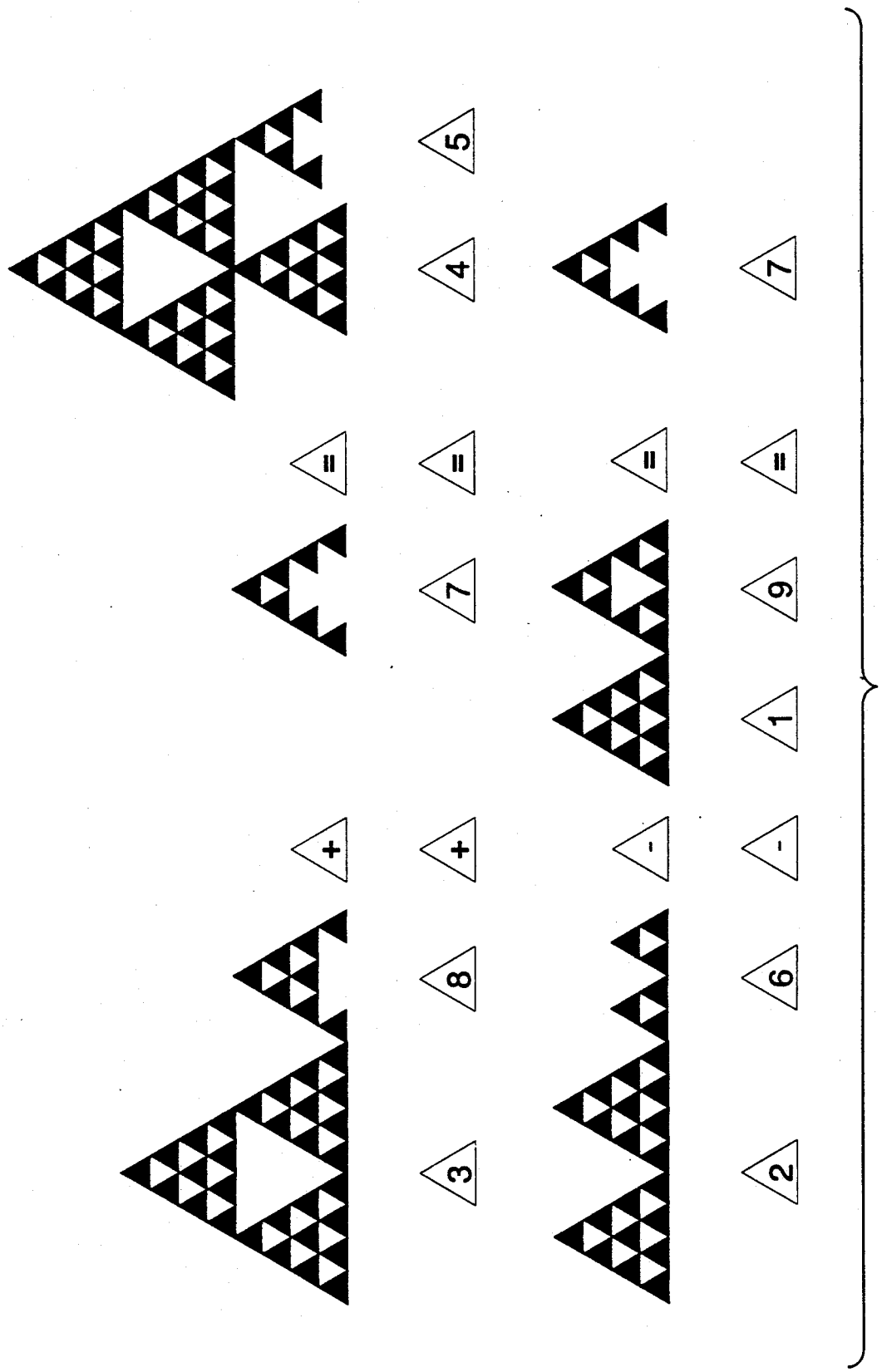
FIG. 8 is a plan view describing multiple digit addition and subtraction.

The top line in FIG. 8 gives a schematic presentation of addition. The child will bunch and count unit triangles together. If the number of unit triangles exceeds ten then a super is naturally created. The child will carry it and count it with the supers when their turn comes. Visually the child will see how many unit triangles are left. In the second step the child will bunch and count the super triangles including the ones that were carried. In reference to the top line of FIG. 8, we see that to add thirty eight to seven, first the child adds seven and eight to get super five and then the carried super is added to the three supers for thirty, and finally the result will be four super five or forty five. The Fractal Super Pyramids 70–92 can also be used in a similar manner as above for performing addition.

Figure 9A:
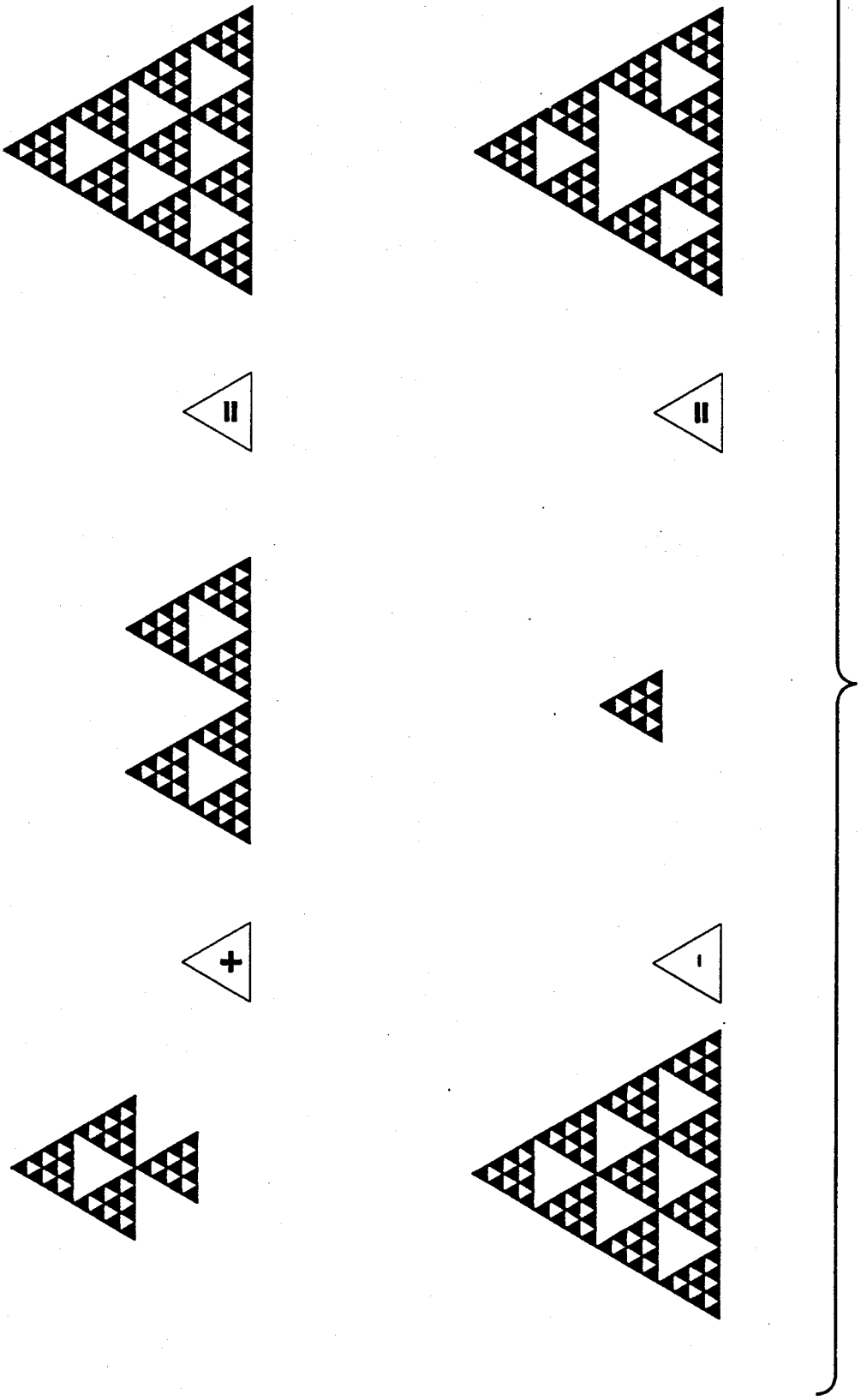
FIGS. 9A–9D are plan views illustrating different techniques for recognizing different representations of multiple digit numbers.

The top part of FIG. 9A presents a schematic diagram for adding four supers (forty) to six supers (sixty) to get super-super (one hundred). Using this example and looking in the Ten Column 61a of the Super Duper Table 50, the child can repeat all the one-digit additions in FIGS. 5A through 5H with super units. The child can also follow the same model for any other column. For example if we add the element in the Four Row 55b and the Two Column 53a, which represents four times two and is equal to 8, to the element in the Four Row 55b and Eight Column 59a, which represents four times eight and is equal to 32, the result will be the element in the Four Row 55b and the Ten Column 61a which represents four times ten and is equal to 40.

Subtraction

Subtraction is called take-away and can be performed with the same setup as for addition, starting with basic units and proceeding with supers. A schematic representations of subtraction is given in the lower line of FIG. 8. First, the child must take-away as many basic units as there are in the second number from the basic units in the first number. If the child does not have enough basic units in the first number to match the number of basic units in the second number then a super must be borrowed from the supers in the first number and be broken up and added to the basic units of the first number. This will, of course, decrease the number of supers in the first number by one. The child will then take away as many supers as these are in the second number from the supers that are left in the first number. The child, following the diagram in the lower line of FIG. 8, can perform the operation twenty six take-away nineteen. First, since six is smaller than nine by three, the child borrows a super from twenty six, leaving it with only one super. The borrowed super is broken up and, when the child takes away the remaining three basic units from it, the number of basic units in the result will be seven. The final result is also seven, as seen in the figure, because the remaining super in twenty six will be taken away by the super in nineteen. The Fractal Super Pyramids 70–92 can also be used in a similar manner as above for performing addition.

The lower line of FIG. 9A presents a schematic diagram that a child can follow for subtracting a super (ten) from super-super (one hundred) to get nine supers (ninety). Using this example and looking in the Ten Column 61a in the Super Duper Table 50, the child can repeat all the one-digit subtractions in FIGS. 5A through 5H with super units. The child can also follow the same model for any other column. For example, if we subtract from the element in the Four Row 55b and the Ten Column 61a, which represents four times ten and is equal to 40, the element in the Four Row 55b and One Column 60a, which represents four times one and is equal to 4, the result will be the element in the Four Row 55b and Nine Column 60a, which represents four times nine and is equal to 36.

Figure 9B:
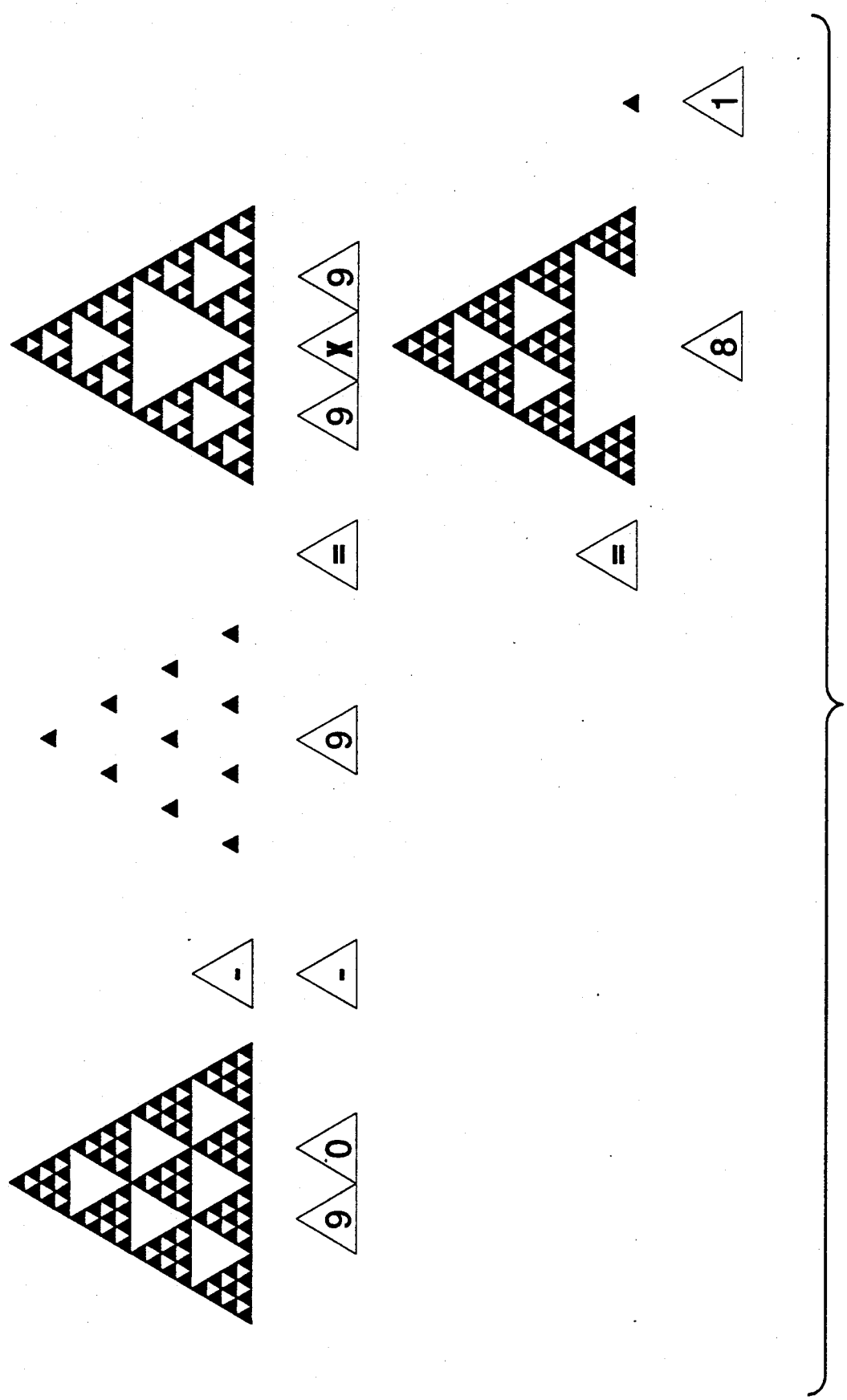

In FIG. 9B is a schematic representation of how a child can subtract nine (9) from nine supers (90) to get eight super one (81). FIG. 9B shows that eighty one is really nine nines or nine times nine. Looking at the super Duper Table 50, the child will notice that using the numbers in the last column i.e., the Ten Column 61a, which are super (ten), two super (twenty), ..., nine super (ninety) and super-super (one hundred), the numbers in next to the last column i.e., the Nine Column 60a, can be found as nine, super eight (eighteen), ..., eight super one (eighty one) and nine super (ninety) by taking away respectively one, two, ... nine and super. The child can continue, in this way, to find the numerical value of all the standard fractal representations of the numbers in the Eight Column, Seven Column, ..., and One Column consecutively.

Multiplication

Figure 10A:
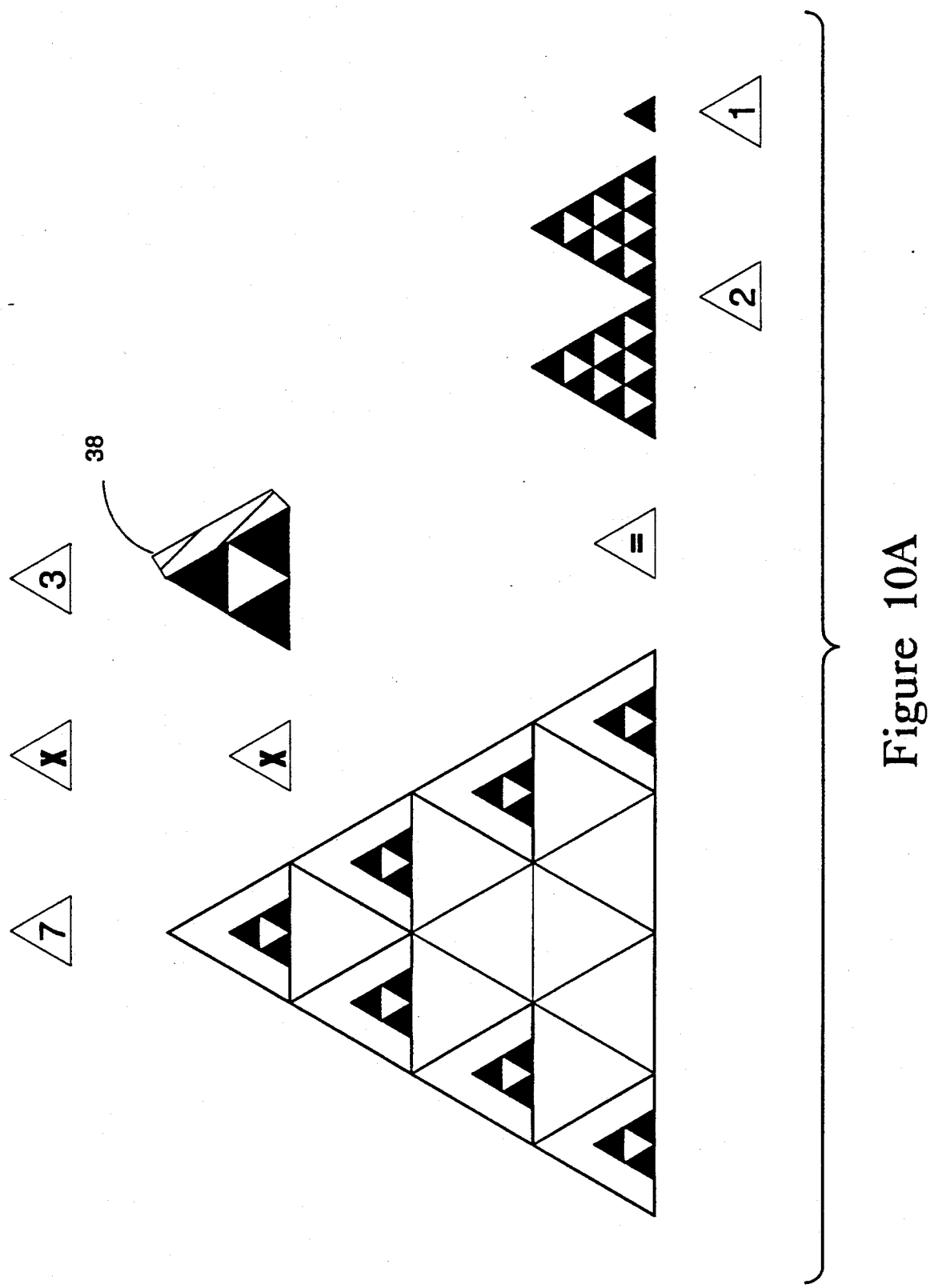
FIGS. 10A–10C are plan views demonstrating multiplication of one-digit numbers and division of two digit numbers by one digit numbers.

In FIG. 10A a schematic diagram for multiplication is presented. The Super Book contains similar illustrations. The child will multiply seven times three by placing seven three's into the outlined seven triangles in the Seven Board. The second number i.e. three is signaled by the Three token 38 from the Super Tokens or the Three pyramid 54 from the Super Pyramids. The child can now add up the unit triangles and find out that seven times three is twenty-one. The child can break up one of the three's into three unit triangles and then form two supers with 3 three's and a unit triangle each. There will only be one unit triangle left over, so the result will be two super one or twenty-one. The child can perform the same operation with the super Duper Table 50 as follows. The array element corresponding to seven times three is in the Seven Row 58b and the Three Column 54a. The method for finding the result is identical to what is described above. The Super board can also be used for multiplication in a similar manner as above. It is clear that by inserting and moving the right number of small and medium triangles all the elements of the Super Duper Table can be reproduced.

Figure 9C:
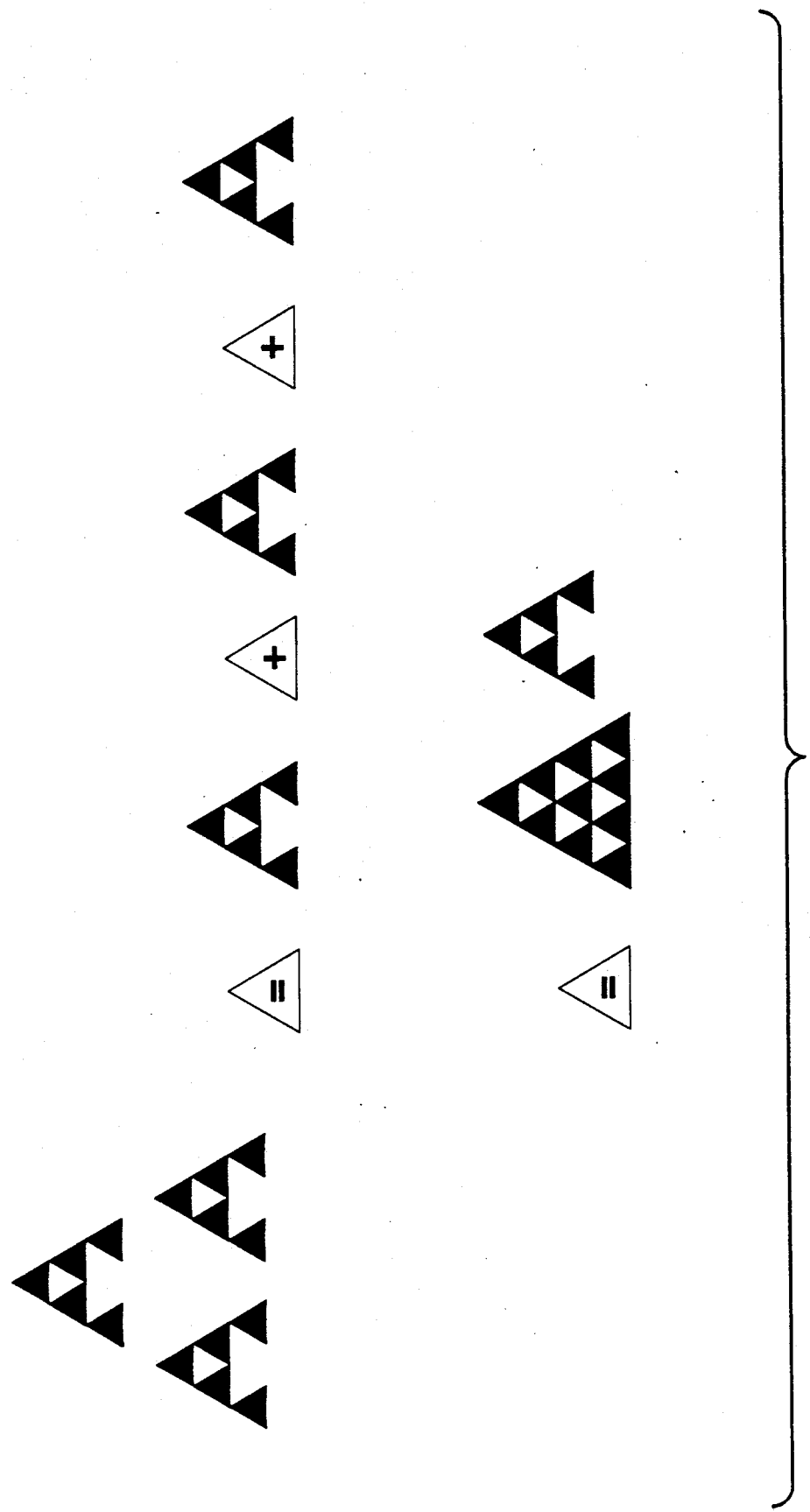
Figure 9D:
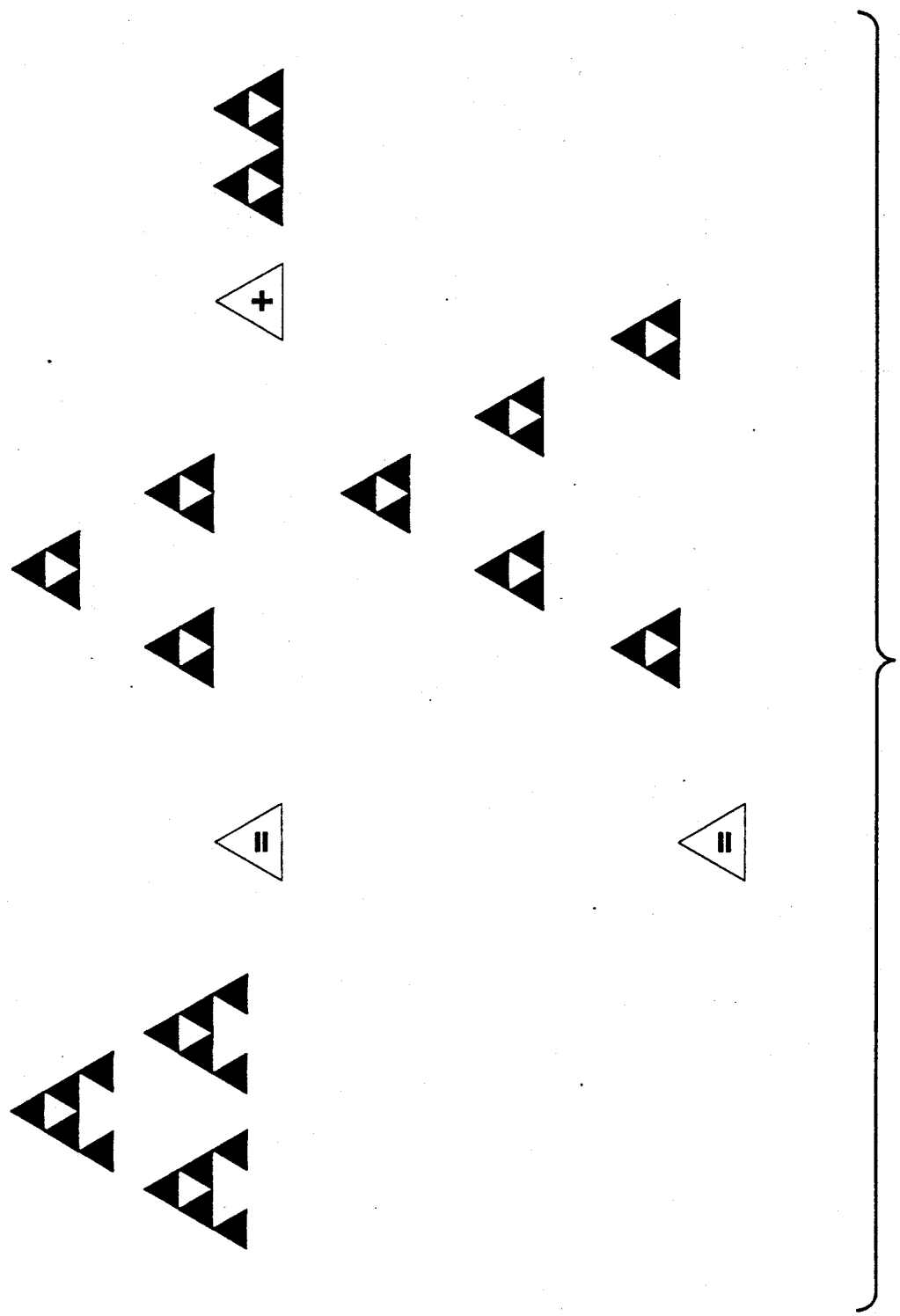

FIGS. 9C and 9D give a schematic representation of the concept of commutativity for multiplication. Using a figure in the Super Book corresponding to FIG. 9C, the child can change, as is described in the Manual, one five piece for an alternate five to see that three times five is equal to super five (fifteen). Using a figure like FIG. 9D, the child can manipulate the 3 five's to get 3 three's and 3 two's. Further manipulation will give the child 5 three's. So the child can conclude that three times five is equal to five times three and both of them correspond to super five (fifteen). Using this example, the child can see that the Super Duper Table 50 is symmetric and that for every element above its main diagonal there is one below its main diagonal which is equal to it.

The Super Book contains many illustrations corresponding to the elements of the Super Duper Table. These illustrations are described in the Manual and will serve to clarify multiplication.

Division

Figure 10B:
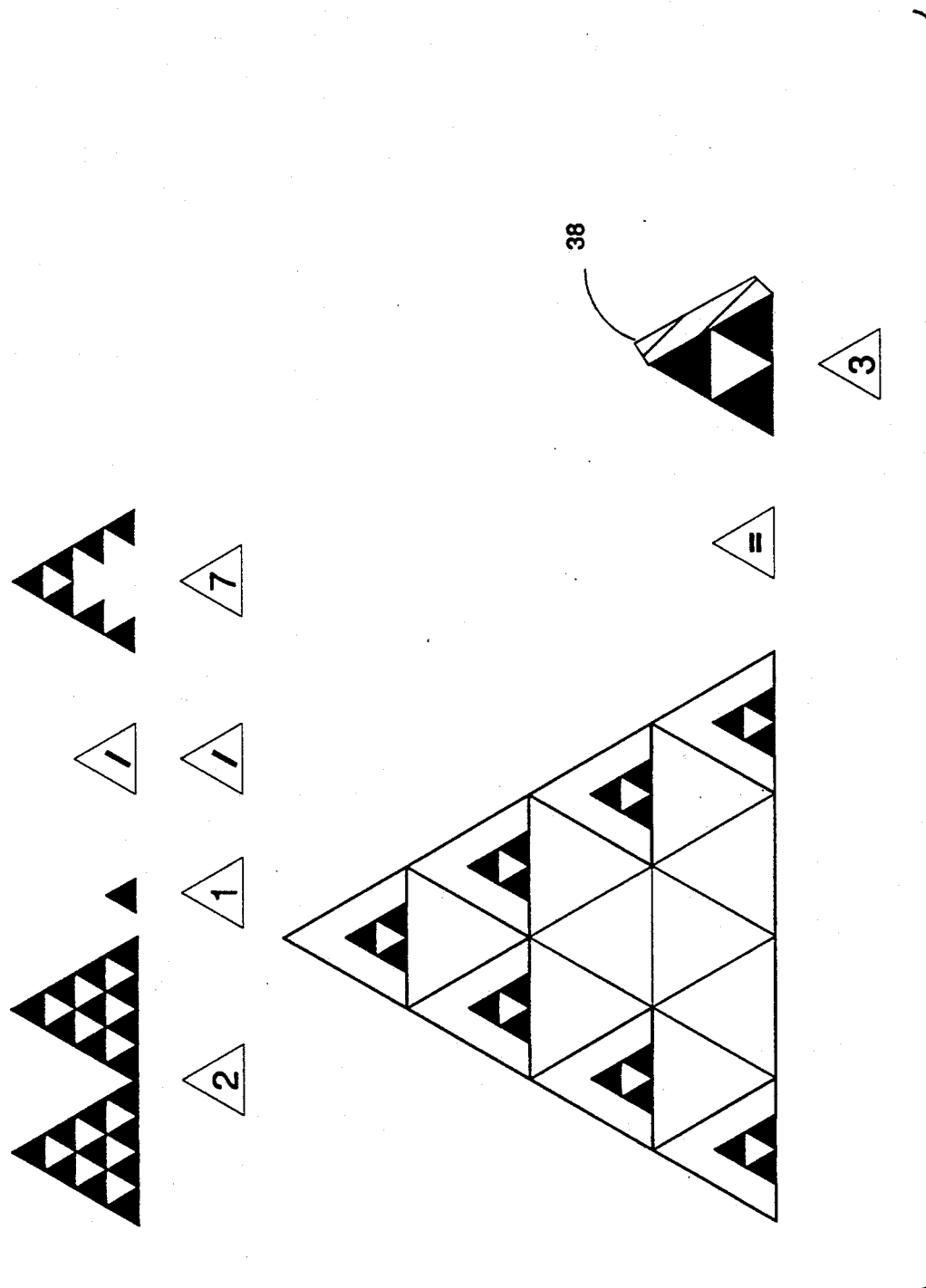

In a Super Book figure like FIG. 10B, a schematic diagram for division is presented. The child, as instructed in the Manual, will divide two super one (twenty-one) into seven equal parts and place each part in one of the seven triangles outlined on the Seven Board. The result, which is three, is immediately apparent, so that the child can conclude that if you divide up twenty-one, into seven equal parts the result is three. In order to divide up twenty-one, the child will break up the two supers into six three's and two one's and, using the basic unit in two super one, the child can make up seven three's and place them into the Seven Board. Alternatively, the child can use twenty-one unit triangles. The child can perform the same operation with the Super Duper Table 50. The array element corresponding to two super one (twenty-one) divided by seven is in the Seven Row 58b and the Three Column 54a. The child can find this column in the Seven Row 58b (which is signaled itself by the divisor) by trial and error. The rule for the child will be to divide all the unit triangles evenly into seven groups. The method for finding the result is identical to what is described above.

The following rules are of general interest for dividing two-digit numbers and can facilitate the memorization of the multiplication table.

Rule 1. If the total number of triangles representing a number (units as well as super units) is three or six, then the child can use the Three Board and divide this number by three. For example, the total number of triangles in super two (twelve) is three (one super plus two unit triangle(s)) so we conclude that twelve is divisible by three.

Rule 2. If the total number of triangles representing a number (units as well as super units) is nine, then the child can use the Nine Board and divide this number by nine. For example, the total number of triangles in eight super one (eighty-one) is nine (eight super plus one unit triangle(s)) so we conclude that eighty one is divisible by nine.

Rule 3. If the representation of a number has five unit triangles or no unit triangles, then the child can use the Five Board and divide this number by five. For example, four super five is divisible by five, it is also divisible by nine.

The figure in the Super Book corresponding to the Super Duper Table can obviously be used to illustrate division and the above rules as is explained in the Manual.

Division with a Remainder

Figure 10C:
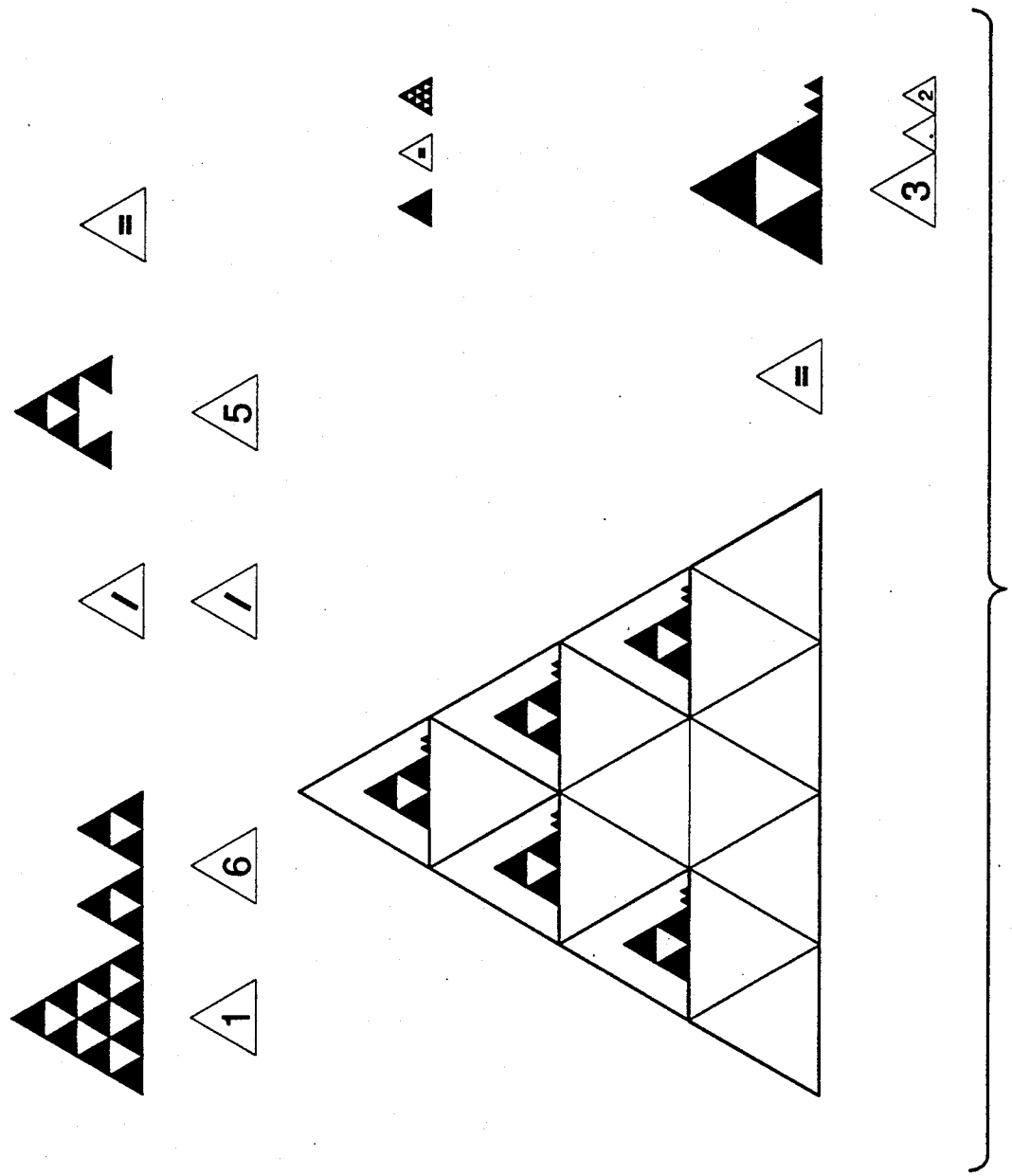

In a Super Book figure corresponding to FIG. 10C, a schematic diagram for division which has a remainder is shown. In this example the child will also learn how to change the remainder into decimals. The child will divide sixteen (medium size) units into five by dividing evenly fifteen medium size unit triangles into five arbitrary Boards arranged as shown into a five shape. There will remain one medium unit triangle so that the child can say sixteen divided by five gives three and one remains. The child can trade in his one medium unit for ten smaller ones as shown in FIG. 10C and divide the ten smaller dupers (to be described hereinafter) into five groups. The result is three units and two dupers. The Manual explains that we write this number as 3.2 where the point separates the dupers from the units. In English the child will read the number as three point two.

4. Numbers in Bases Other than Ten

Figure 11A:
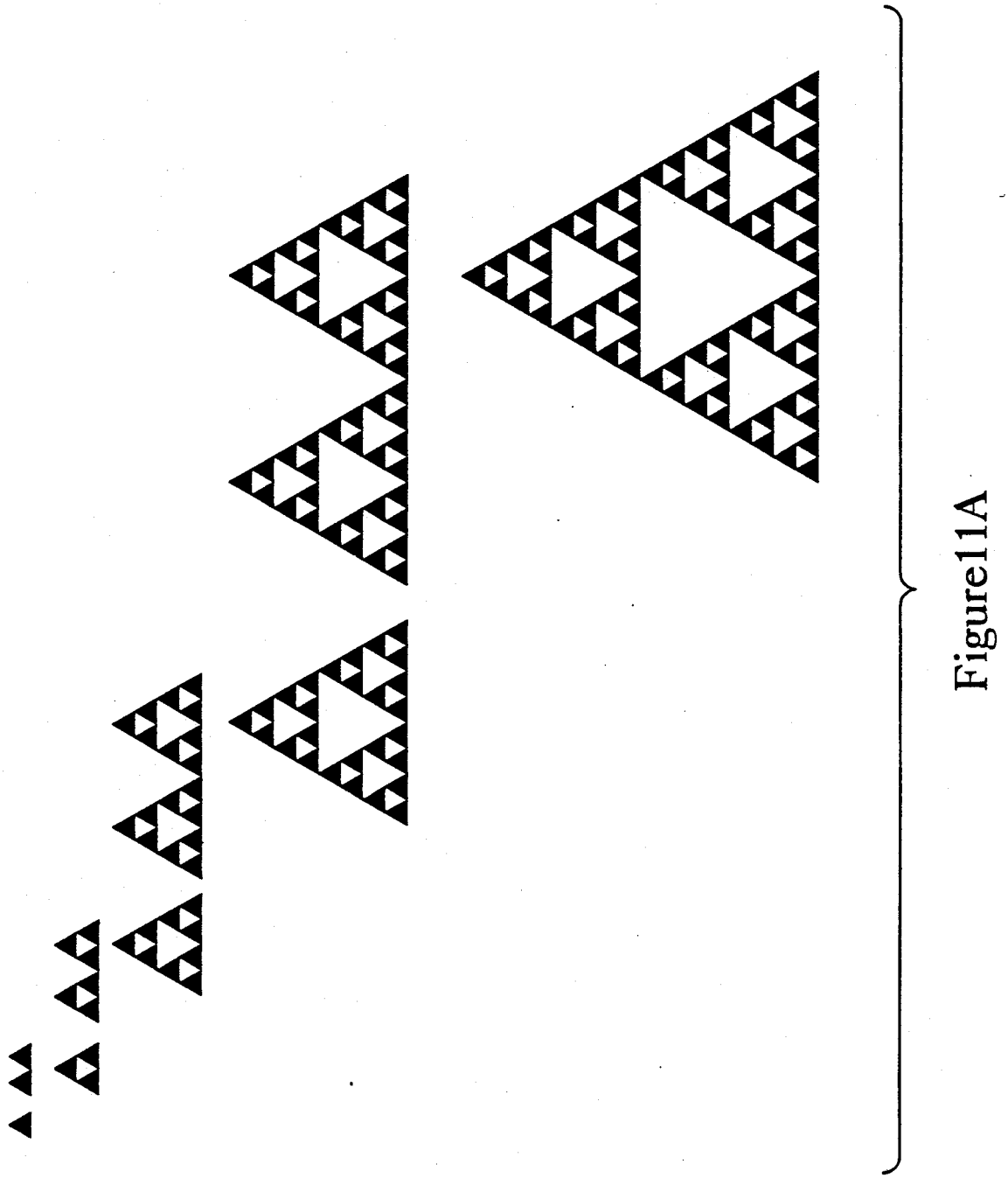
FIGS. 11A–11B are plan views illustrating how the present invention can be used for counting and writing numbers in bases other than ten.

FIG. 11A presents a schematic diagram for counting in base three. There are illustrations corresponding to this figure in the Super Book with adequate explanation in the Manual. The child counts using only the numbers one, two and super as follows: one, two, super, super one, super two, two super, two super one, two super two, and now continuing with the largest units only the child will say super-super, two super-super, super-super-super, two super-super-super, super-super-super-super. In FIG. 11A, the child is counting by successive units, super, super-supers and super-super-supers. This nomenclature can be used even in English or other languages which now, lack the proper nomenclature for naming numbers in bases other than ten. As a matter of fact, most of the difficulty of teaching the number systems in bases other than ten stems from the this lack of proper nomenclature.

Figure 11B:
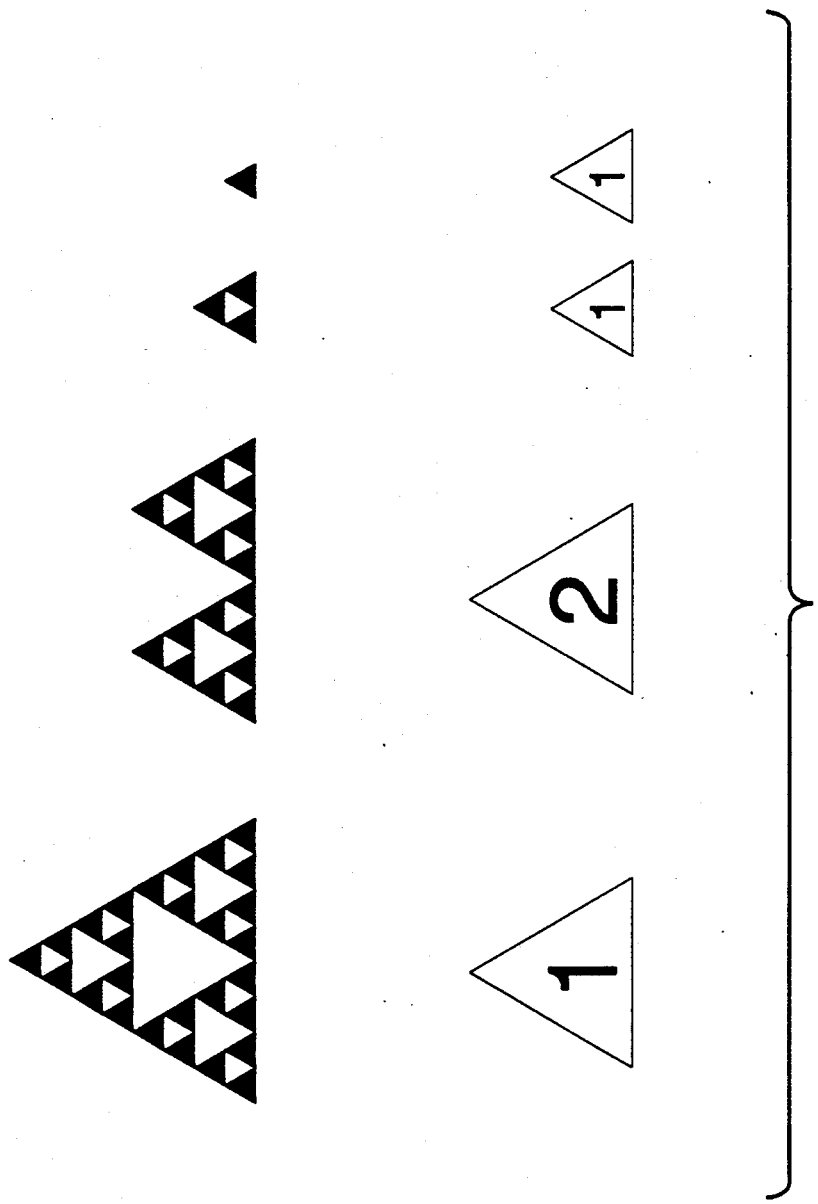

In FIG. 11B a schematic diagram for writing a number in base three is presented this figure is reproduced from a group of corresponding figures in the Super Book according to the explanation given in the Manual. The child learns that in base three one super-super-super two super-super one super one is written as 1211. The child can manipulate the unit triangles to find out that this number in base ten is equal to 49. This is easily accomplished by putting 3 unit triangles from super in the three empty places in each of the super-supers in the super-super-super to get thirty and then putting one unit triangle into one of the two super-supers to get nineteen (ten plus nine), adding it all up we get forty nine (thirty plus nineteen). Alternatively, the child can figure out that super is three, super-super is nine and super-super-super is twenty seven in base ten so that 1211 in base three is equal to $1 \times 27 + 2 \times (9) + 1 \times (3) + 1 = 49$. Using the same technique, the child will notice that in FIG. 11A the numbers are 1, 2, 10, 20, 100, 200, 1000, 2000, 10000.

The Super Duper Table 50 and the corresponding figures in the Super Book, as is explained in the Super Book, can also be used to count from one (1) to super-super (100) in all bases from two to ten. It can also show the relation of numbers in a given base and multiplying or dividing numbers by this same base. In short the child will learn that for example three super (in base seven) is really three times seven. In other words multiplying a number by another number, which is larger or equal to it, is like taking as many supers as the first number in the base specified by the second number. In addition, the child will learn that three super in base seven (twenty-one) is necessarily divisible by seven. In other words we can duper (as is explained hereinafter) in base seven three super to get three.

5. Powers, Roots, Decimals, Fractions and Ratios

The Super Duper Table 50 is a fractal representation of the multiplication table. It has already been described how this table can be used for the four basic operations of addition, subtraction, multiplication and division. It will now be explained how a child can use the Super Duper Table 50, and also the Fractal Super Triangles, the Maxi Fractal Super Triangles, or the Fractal Super Board to learn about powers, roots, decimals and simple fractions and ratios. The Super Book contains figures corresponding to the Super Duper Table which serve as illustrations for the above concepts. These concepts are also adequately explained in the Manual.

Powers

The child has already learned that, in any base from one to ten, Super is a 1 with one 0 i.e. 10, super-super is a 1 with two 0's i.e. 100, and super-super-super is a 1 with three 0's i.e. 1000. Now the child can comprehend what is meant by power by learning that, super (10) to the power two is super-super (100), and to the power three is super-super-super (1000). In base ten this implies that the super-super (one hundred) triangle or pyramid is the super (ten) triangle or pyramid to the power two, and the super-super-super (one thousand) construction with triangles or the pyramids is the super triangle or pyramid to the power three. The child can easily understand that super to the power six is 1,000,000 and is read as super-super-super-super-super-super or simply a million!

The Super Duper Table 50 offers the children a good tool for understanding the concept of power. Children will easily recognize that the elements on the main diagonal (from upper left to lower right) in the Super Duper Table have a particular symmetry. In fact, each of these elements has the same outline as the number that is repeated in each basic medium triangle in the outline. The child will recognize this as the property of super-super in any base. For example, the last element in the table 50 is super-super in base ten which is ten to the power two and is equal to one hundred, or the element in the Nine Row 60b and the Nine Column 60a is super-super in base nine which is nine to the power two and is equal to eighty one.

The Super Duper Table 50 can be used by a child for visualizing powers greater than two. For example three to the power three, which is super-super-super in base three is the element in the Three Row 54b and the Nine Column 60a and is equal to twenty seven, and three to the power four, which is super-super-super-super in base three is the element in the Nine Row 60b and the Nine Column 60a and is equal to eighty one.

Roots

Roots are the inverses of powers. So with the Fractal Super Triangles set and the Super Duper Table 50, exact roots of two- and three- digit numbers can be calculated and, more importantly, the concept of roots can be clarified. Again, using the diagonal elements of the Super Duper Table 50, the child can see that the square root of super-super (100) in any base is super (10) in that base, e.g. the square root of four is two, ..., and the square root of eighty one is nine and the square root of a hundred is ten. The child can also see that (in base three) the cube (or third) root of twenty seven (super-super-super) is three and that the fourth root of eighty one (super-super-super-super in base three) is also three.

Decimals, Fractions and Ratios

Using The Super Duper Table 50 and the corresponding figures in the Super Book and explanations in the Manual, the child can see that if super-super in base ten was one unit, then super will be one tenth of it. This new sub-unit is called a duper. The original unit triangle is now one hundredth of the new unit triangle and is called a duper-duper. In this way the child can learn about decimals. The child can be taught to write numbers with decimals with examples similar to the one presented in FIG. 7, with the dupers separated from units with a decimal point ("."). What would be important for the child to realize is that the basic unit triangle is really made of dupers, which are made out of duper-dupers, etc. Initially, this structure has been hidden from small children so that they would work with whole numbers. If we let hundred be the new basic unit, as in the previous paragraph, then the shapes in the Ten Column 61a in the Super Duper Table 50 can be used for representing decimal fractions: 0.1, 0.2, ..., 0.9, and 1, which will be called, respectively, one duper, two duper, ..., nine duper and one (super duper is one). Similarly the numbers in the One Row 52b will represent 0.01, 0.02, ..., 0.09 and 0.10, which will be called one duper-duper, two duper-duper, ..., nine duper-duper and duper (super duper-duper is duper).

All other simple fractions and ratios can also be represented in the Super Duper Table 50. For example, considering the element in the Nine Row 60b and the Nine Column 60a—super-super in base nine—as the one unit the elements in the Nine Column 60a from the One Row 52b to the Eight Row 59b will represent 1/9, 2/9, ..., and 8/9 respectively. It is clear that the child can learn about all simple fractions by playing with the Super Duper Table 50.

6. Orders of Magnitude, Limits Tending to Infinity and Zero

Using the Fractal Super Triangles or the Maxi Fractal Super Triangles, the Super Duper Table 50, or the Fractal Super Board, the child can count from one to super-super. The child can also continue to count to super-super-super, which is rather large in size, with the Fractal Super Triangles. The child can then appreciate an order of magnitude for super-super-super-super e.g. it is as big as a room. Other orders of magnitude can be given, like the apartment, the block and finally, it can be said that infinity is super-super-super-super-super- ... and is the size of the universe.

It is clear that the same way that super-super-super-super-super- ... is getting larger and larger and going to infinity, duper-duper-duper-duper-duper- ... is getting smaller and smaller and going to zero. Thus, the basic notion of a limit tending to zero is being communicated to the child. It is evident now that the hierarchy of the supers can be enhanced as follows: zero, ..., duper-duper-duper-duper-duper, ..., duper, one, two, three, four, five, six, seven, eight, nine, super, ..., super-super-super-super-super, ..., infinity. What is of particular interest is that the child needs only thirteen names to comprehend the whole of the positive number system, i.e., exactly one name more than the ten numerals and two mathematical symbols "0", "1", "2", "3", "4", "5", "6", "7", "8", "9", "." and "∞" which are needed to accomplish the same task.

The Super Book contains figures illustrating the concepts of limits tending to infinity (by showing how super-super- ... -super grows), and tending to zero (by showing how duper-duper- ... -duper vanishes). The Manual also contains a description of the above concepts.

7. The Fractal Structures

Figure 12:
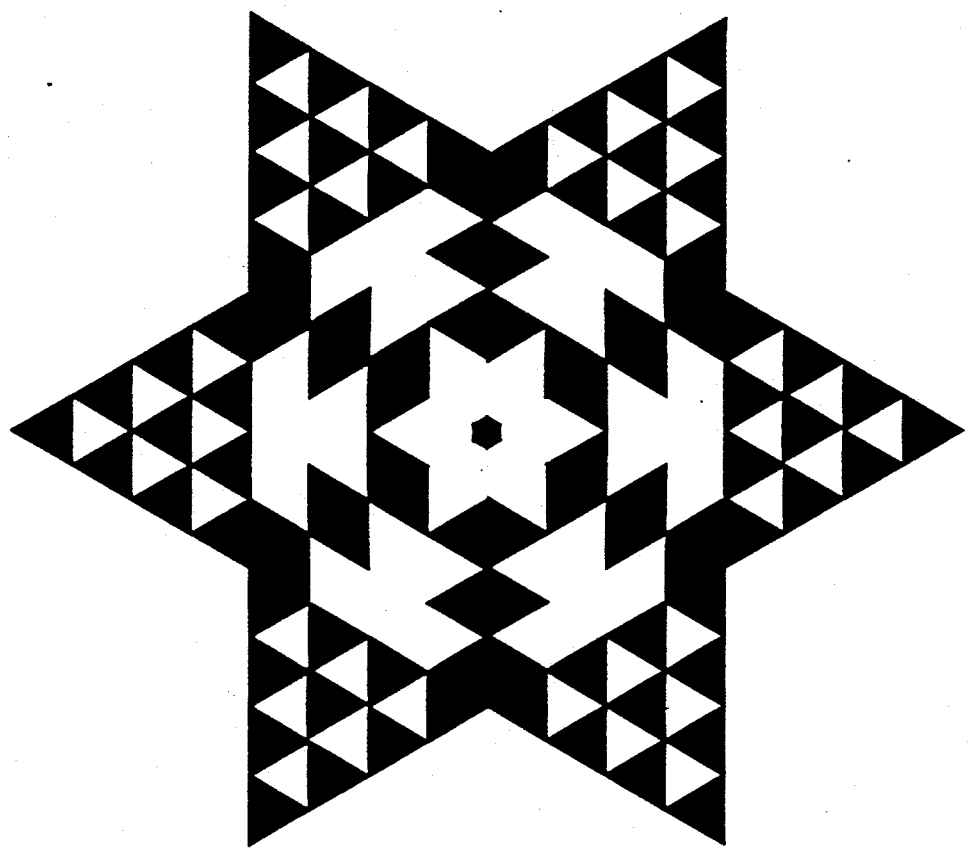
FIG. 12 is a plan view of a shape developed in the Fractal game using the present invention.

Fractal structures in mathematics are defined as structures which are self similar in different scales. The present invention offers a fascinating tool for a child to play with, comprehend and appreciate fractal structures. The Fractal Super Triangles, the Maxi Fractal Super Triangles set, and the Fractal Super Board provide many games which can be used by children and adults to produce fractal designs. In FIG. 12, one such design is presented. This example and other examples are included in the Super Book. As there are 1200 points of attachments on the twelve Boards, in the Fractal Super Triangles set or 100 in the Maxi Fractal Super Triangles set complex and beautiful shapes can be produced with the medium and small manipulative pieces. The basic game can contain some basic units in different colors to allow a richer coloring of the fractal designs. It should be noted that the representation used for the number nine in the present invention is called the Sierpinski triangle and is a well known fractal structure.

We claim:

1. A kit of fractal elements for learning mathematical concepts comprising:
   at least one primary element having a first surface in the shape of an equilateral triangle, said surface having ten attachment areas arranged in an equilateral triangular pattern and non-attachment areas, said attachment areas being visibly different from said non-attachment areas; and a first set of manipulative elements attachable to said attachment areas, said manipulative elements each including at least one basic equilateral triangular unit, and at least one of said manipulative elements comprising a plurality of said basic equilateral triangular units connected to one another in a predetermined pattern having an axis of symmetry.

2. The kit of claim 1, wherein said first set includes a manipulative element composed of one basic equilateral triangular unit, and manipulative elements composed of two through ten basic equilateral triangular units in predetermined patterns for representing the numbers 2 through 10.

3. The kit of claim 2, wherein said set further includes a manipulative element composed of five of said basic equilateral triangular units connected in an alternate predetermined pattern different from the previously recited predetermined pattern of five basic equilateral triangular units for representing the number 5.

4. The kit of claim 2, wherein said primary element has a side on which is defined a pattern of equilateral triangular shapes, the shapes of the manipulative elements representing the numbers 1 through 10 being included in said pattern.

5. The kit of claim 1, wherein the manipulative element representing each number is colored differently from the manipulative elements representing all other numbers.

6. The kit of claim 1, wherein each of the manipulative elements of said first set have side walls, and said elements representing numbers greater than 1 further have elongate elements connecting the side walls of adjacent basic equilateral triangular units.

7. The kit of claim 2, wherein each combination of two of said manipulative elements of said first set which has ten equilateral triangular units defines the outline of said first surface of a primary element.

8. The kit of claim 1, wherein each said manipulative element has an axis of symmetry.

9. The kit of claim 1, wherein each basic equilateral triangular unit of each manipulative element has apices pointing in the same directions as the apices of any other basic equilateral triangular units in said manipulative element.

10. The kit of claim 1, wherein there are twelve primary elements.

11. The kit of claim 1, wherein said attachment areas comprise compartments defined on said primary elements.

12. The kit of claim 1, further comprising means for releasably securing said manipulative elements to said attachment areas.

13. The kit of claim 12, wherein said releasable securing means is magnetic.

14. The kit of claim 12, wherein said releasable securing means comprises hook-and-look fasteners.

15. The kit of claim 12, wherein said means for releasably securing comprises a well in each of said attachment areas and a stem projecting from each of said manipulative elements.

16. The kit of claim 1, further comprising a second set of manipulative elements, each element of said second set being smaller than the elements of said first set.

17. The kit of claim 1, wherein the first set of manipulative elements further includes basic unit triangles each having one of the numbers zero to nine marked thereon.

18. The kit of claim 1, wherein said first set of manipulative elements further includes basic unit triangles each representing a mathematical operation.

19. The kit of claim 1, wherein said first set of manipulative elements further includes basic unit triangles representing mathematical equality and basic unit triangles representing mathematical inequality.

20. The kit of claim wherein each of said manipulative elements representing an even number has a first surface texture, and each of said manipulative elements representing an odd number has a second surface texture different from said first surface texture.

21. The kit of claim 1, further comprising a work book for instructing the user in the application and use of the Fractal elements in performing mathematical operations.

22. The kit of claim 21, further comprising a user's manual for instructing the user how to employ the illustrations of the work book and the Fractal elements to learn various mathematical concepts.

23. The kit of claim 1, wherein any combination of said manipulative elements which has ten equilateral triangular units and which coincides with said attachment areas defines the outline of said first surface of a primary element.

24. The kit of claim 1, wherein said primary element has a plurality of surfaces each having the shape of an equilateral triangle.

25. The kit of claim 1, further comprising a plurality of pyramids.

26. The kit of claim 25, further comprising means for stacking a plurality of said pyramids to define a larger pyramid.

27. A kit of fractal elements for learning mathematical concepts comprising:

at least one primary element having a first surface in the shape of an equilateral triangle, said surface having ten attachment areas arranged in an equilateral triangular pattern and non-attachment areas, said attachment areas being visibly different from said non-attachment areas;

a first set of manipulative elements attachable to said attachment areas, said manipulative elements each including at least one basic equilateral triangular unit;

a plurality of pyramids; and means for stacking a plurality of said pyramids to define a larger pyramid, wherein said stacking means comprises a plurality of trays of different sizes.

28. The kit of claim 1, wherein each said attachment area has the shape of an equilateral triangle having sides parallel to the sides of the equilateral triangle defined by the primary element.

29. The kit of claim 28, wherein there are six of said non-attachment areas each defining an equilateral triangle inverted with respect to the equilateral triangles defined by each attachment area, the attachment areas and non-attachment areas being in a symmetric arrangement and covering substantially the entire first surface of the primary element.

30. A kit of fractal elements for learning mathematical concepts comprising:

at least one primary element having a first surface in the shape of an equilateral triangle, said surface having ten attachment areas arranged in an equilateral triangular pattern and non-attachment areas, said attachment areas being visibly different from said non-attachment areas;

a first set of manipulative elements attachable to said attachment areas, said manipulative elements each including at least one basic equilateral triangular unit; and means for releasably connecting said basic equilateral triangular units to one another in predetermined patterns to form manipulative elements for representing the numbers 2 through 10.

31. A kit of fractal elements for learning mathematical concepts comprising:

at least one primary element having a first surface in the shape of an equilateral triangle, said surface having ten attachment areas arranged in an equilateral triangular pattern and non-attachment areas, said attachment areas being visibly different from said non-attachment areas;

a first set of manipulative elements attachable to said attachment areas, said manipulative elements each including at least one basic equilateral triangular unit, wherein said primary element has a second surface having ten areas arranged in the equilateral triangular pattern in which said attachment areas are arranged, said ten areas comprising the fractal representation of the number ten, and six complementary areas within the arrangement of said ten areas and defined by said ten areas.

32. The kit of claim 31, wherein said primary element has first and second opposite sides, each said first surface being defined on said first side and each said second surface being defined on said second side.

33. A kit of fractal elements for learning mathematical concepts comprising:

at least one primary element having a first surface in the shape of an equilateral triangle, said surface having ten attachment areas arranged in an equilateral triangular pattern and non-attachment areas, said attachment areas being visibly different from said non-attachment areas;

a first set of manipulative elements attachable to said attachment areas, said manipulative elements each including at least one basic equilateral triangular unit, wherein the manipulative elements of said first set have ridges and said primary element has three side walls each having a dovetail groove for receiving the ridges of the manipulative elements, and said kit further includes a second set of manipulative elements having the same size as the manipulative elements of said first set, each of the manipulative elements of said second set having dovetail grooves for receiving the ridges of the manipulative elements of said first set.

34. A kit of fractal elements for learning mathematical concepts comprising:

at least one primary element having a first surface in the shape of an equilateral triangle, said surface having ten attachment areas arranged in an equilateral triangular pattern and non-attachment areas, said attachment areas being visibly different from said non-attachment areas;

a first set of manipulative elements attachable to said attachment areas, said manipulative elements each including at least one basic equilateral triangular unit; and means for releasably securing said manipulative elements to said attachment areas, wherein said means for releasably securing comprises a well in each of said attachment areas and a stem projecting from each of said manipulative elements, and wherein each primary element further has a groove extending between adjacent wells, said stems being movable through said grooves.

35. The kit of claim 34, wherein the end of each stem distal to the manipulative element defines a head of resilient material and each said well includes a top portion having a first cross sectional area and a bottom portion having a second cross sectional area larger than said first cross sectional area, said head having a third cross sectional area larger than said first cross sectional area but smaller than said second cross sectional area.

36. A kit of fractal elements for learning mathematical concepts comprising:

at least one primary element having a first surface in the shape of an equilateral triangle, said surface having ten attachment areas arranged in an equilateral triangular pattern and non-attachment areas, said attachment areas being visibly different from said non-attachment areas;

a first set of manipulative elements attachable to said attachment areas, said manipulative elements each including at least one basic equilateral triangular unit, wherein each of said attachment areas is comprised of ten attachment subareas arranged in an equilateral triangular pattern.

* * * * *